United States Patent
Suzuki et al.

(10) Patent No.: US 6,813,051 B2
(45) Date of Patent: Nov. 2, 2004

(54) OPTICAL SCANNER AND IMAGE FORMING APPARATUS

(75) Inventors: Seizo Suzuki, Tokyo (JP); Naoki Miyatake, Tokyo (JP); Shigeaki Imai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/778,032

(22) Filed: Feb. 17, 2004

(65) Prior Publication Data

US 2004/0165240 A1 Aug. 26, 2004

(30) Foreign Application Priority Data

Feb. 17, 2003 (JP) ........................................ 2003-038716

(51) Int. Cl.⁷ .............................................. G02B 26/08
(52) U.S. Cl. ...................... 359/205; 359/204; 359/207; 347/244
(58) Field of Search ................................ 359/204–207, 359/212–219, 662, 717; 347/233, 239, 241, 243, 244

(56) References Cited

U.S. PATENT DOCUMENTS

| | | | |
|---|---|---|---|
| 5,875,051 A | * | 2/1999 | Suzuki et al. ............... 359/205 |
| 5,883,732 A | * | 3/1999 | Takada et al. ............... 359/207 |
| 6,596,985 B2 | | 7/2003 | Sakai et al. |
| 6,621,512 B2 | | 9/2003 | Nakajima et al. |
| 6,657,761 B2 | | 12/2003 | Suzuki et al. |

FOREIGN PATENT DOCUMENTS

| JP | 9-54263 | 2/1997 |
|---|---|---|
| JP | 2001-4948 | 1/2001 |
| JP | 2001-10107 | 1/2001 |
| JP | 2002-36625 | 2/2002 |

\* cited by examiner

*Primary Examiner*—James Phan
(74) *Attorney, Agent, or Firm*—Oblon, Spivak, McClelland, Maier & Neustadt, P.C.

(57) ABSTRACT

A scanning imaging lens includes at least two scanning lenses. Of the scanning lens, the scanning lens that is closer to a deflection unit is formed by resin molding, and has a positive refracting power in the horizontal scanning direction, with zero or close to zero refracting power in the vertical scanning direction, and has a function of correcting constant velocity characteristic in the optical scanning. The scanning lens that is closer to the surface to be scanned has a weak refracting power in the horizontal scanning direction and a strong positive refracting power in the vertical scanning direction, and the linearity Lin of the scanning imaging lens satisfies the condition 2.0<Lin<10.0(%).

10 Claims, 13 Drawing Sheets

FIELD CURVATURE

CONSTANT VELOCITY CHARACTERISTIC

FIELD CURVATURE

CONSTANT VELOCITY CHARACTERISTIC

SPOT DIAMETER IN THE HORIZONTAL SCANNING DIRECTION
(Y-AXIS: μm)

SPOT DIAMETER IN THE VERTICAL SCANNING DIRECTION
(Y-AXIS: μm)

SPOT DIAMETER IN THE HORIZONTAL SCANNING DIRECTION
(Y-AXIS: μm)

SPOT DIAMETER IN THE VERTICAL SCANNING DIRECTION
(Y-AXIS: μm)

OPTICAL SCANNER AND IMAGE FORMING APPARATUS

CROSS-REFERENCE TO RELATED APPLICATIONS

The present document incorporates by reference the entire contents of Japanese priority document, 2003-038716 filed in Japan on Feb. 17, 2003.

BACKGROUND OF THE INVENTION

1) Field of the Invention

The present invention relates to an optical scanner and an image forming apparatus.

2) Description of the Related Art

Optical scanners are widely used as a device for writing an image in the image forming apparatuses such as digital copying machines, optical printers, or facsimile machine. In the various types of image forming apparatus that use the optical scanner, the colorization is improved and accompanying this, the optical scanners are required to have high performance.

The characteristics of the optical scanner include constant velocity characteristic in optical scanning, spot diameter of a light spot, stability of the spot diameter, linearity of the scan line, optical scanning speed. It is ideal that all these characteristics are excellent, but it is difficult to achieve all superior characteristics. Moreover, some characteristics may deteriorate when other characteristics are excellent.

To achieve better optical characteristics, for example, to achieve better field curvature and a small spot diameter, it is now essential to adopt a "special surface represented by an aspheric surface" for lenses in the optical system. A resin lens has been widely used in the optical system because it can easily achieve a lens having such a special surface at a low cost.

When the resin lens is formed by resin molding, there are problems such as occurrence of refractive index distribution at the time of cooling the lens in a mold, deformation such as "shrinkage", and deterioration in the transfer accuracy on the molded surface.

Such problems are likely to occur when the molded resin lens is thick, and when a difference in thickness at a central portion and the peripheral portion of the lens is large. On the other hand, a certain degree of thickness difference between the central portion and the peripheral portion of the lens is required, in order to favorably correct the "constant velocity characteristic", which is important as the optical characteristics.

Recently, four-drum tandem type color image forming apparatuses have been put into practical use. In these four-drum tandem type color image forming apparatuses, four photosensitive drums are arranged in a feeding direction of transfer paper, these are optically scanned simultaneously to form an electrostatic latent image thereon, the electrostatic latent images formed are visualized by toners such as yellow, magenta, cyan, and black, and the respective color toner images are transferred onto the same transfer paper and superposed on each other, to thereby obtain a color image.

In the four-drum tandem type color image forming apparatus, generally a deflection unit is shared by all the optical beams that optically scan four photosensitive materials to achieve compactness. As a method of sharing such a deflection unit by the whole optical beams a counter-scanning method (Japanese Patent Application Laid-open No. H9-54263) and a one-side scanning method (Japanese Patent Application Laid-open No. 2001-4948, Japanese Patent Application Laid-open No. 2001-10107, respectively) are known. In the counter-scanning method, optical beams are made to enter from opposite sides of the deflection unit, and the optical beams are divided to the opposite sides of the deflection unit to perform deflection scanning. In the one-side scanning method in which the whole optical beams are made to enter from one side of the deflection unit, and the whole optical beams are directed in the same direction on one side of the deflection unit, to perform deflection scanning.

In such counter-scanning type and one-side scanning type color image forming apparatus, if a resin lens is used in the optical scanning optical system, optical characteristics of the optical scanning optical system involved in the optical scanning of the respective photosensitive materials become different, due to non-uniform temperature distribution in the apparatus resulting from the heat generated in the deflection unit. For example, there is a problem in that a phenomenon referred to as "out-of-color registration" occurs in the color image formed by superposing toner images of the respective colors, due to uneven constant velocity characteristic, to thereby deteriorate the image quality. Further, when a plurality of color images are continuously formed, there is a problem in that occurrence of out-of-color registration changes with lapse of time, due to a temperature rise in the apparatus resulting from the continuous operation of the apparatus, and the hue in the formed color image changes, and hence the hue of the formed color images is different.

Japanese Patent Application Laid-open No. 2002-036625 describes a technique to correct such the out-of-color registration.

SUMMARY OF THE INVENTION

It is an object of the present invention to solve at least the problems in the conventional technology.

An optical scanner according to one aspect of the present invention includes a deflecting unit that deflects optical beams emitted from a light source at a constant angular velocity; and a scanning imaging lens that condenses the optical beams deflected on a surface to be scanned, the scanning imaging lens including at a first lens that is arranged closer to the deflection unit and a second lens that is arranged closer to the surface to be scanned. The first lens is formed by resin molding, and has a positive refracting power in the horizontal scanning direction, with zero or close to zero refracting power in the vertical scanning direction, and has a function of correcting a constant velocity characteristic in the optical scanning. The second lens has a weak refracting power in the horizontal scanning direction and a strong positive refracting power in the vertical scanning direction. When it is assumed that a deflection angle of optical beams deflected by the deflection unit is $\theta$, an image height at the deflection angle $\theta$ of the light spot is $H(\theta)$, and an ideal image height at the deflection angle $\theta$ of the light spot is $k\theta$, designating k as a constant, the linearity Lin of the scanning imaging lens defined by $Lin = [\{(dH(\theta)/d\theta)/k\} - 1] \times 100$ (%) satisfies a condition $2.0 < Lin < 10.0(\%)$.

An image forming apparatus according to another aspect of the present invention includes the optical scanner according to the above aspect.

The other objects, features, and advantages of the present invention are specifically set forth in or will become apparent from the following detailed descriptions of the invention when read in conjunction with the accompanying drawings.

DETAILED DESCRIPTION

Exemplary embodiments of an optical arrangement, an optical scanner, and an image forming apparatus according to the present invention are explained in detail below while referring to the accompanying drawings.

Figure 1:
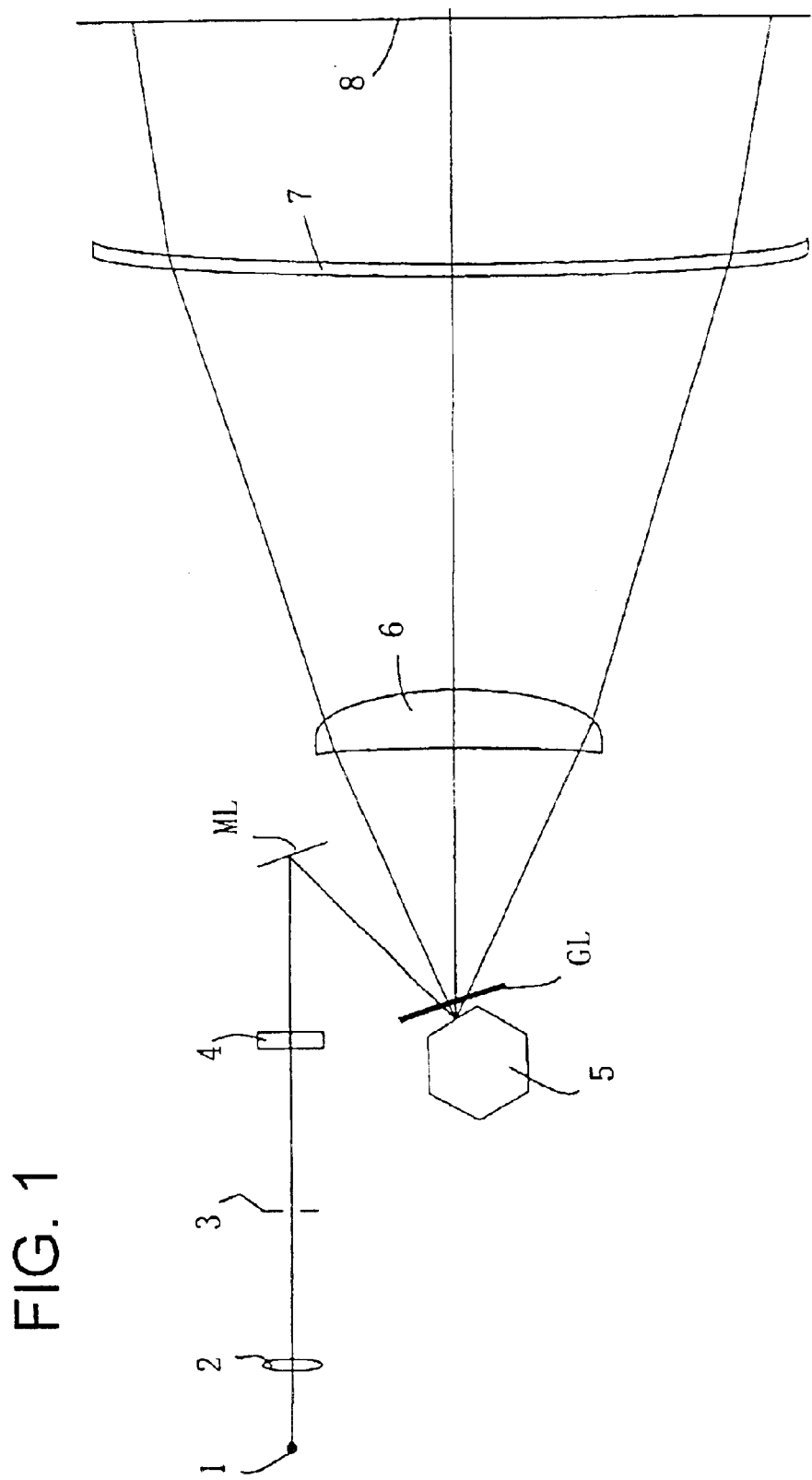
FIG. 1 illustrates one example of an optical arrangement in an optical scanner according to an embodiment of the present invention.

FIG. 1 illustrates one example of an optical arrangement in an optical scanner according to an embodiment of the present invention;

Optical beams emitted from a semiconductor laser light source 1 are formed into parallel luminous flux by a coupling lens 2. It should be noted that the optical beams may be formed into luminous flux having weak convergence or weak divergence, instead of being the parallel luminous flux. The coupled optical beams pass through an opening of an aperture 3 for obtaining a desired spot diameter on the surface to be scanned, to be subjected to beam forming, converged to the vertical scanning direction by a cylindrical lens 4, being a line image forming optical system, with the optical path folded back by a mirror ML, and imaged in the vicinity of the position of the deflection reflecting surface of the polygon mirror 5, which is a deflection unit, as a "line image long in the horizontal scanning direction".

The optical beams reflected by the deflection reflecting surface of the polygon mirror 5 are deflected at a constant angular velocity, by equal velocity rotation of the polygon mirror 5, transmit through a scanning imaging lens that includes two scanning lenses 6 and 7 and guided to the surface 8 to be scanned. The optical beams are then gathered on the surface 8 to be scanned as a light spot by the action of the scanning imaging lens, to thereby optically scan the surface 8 to be scanned.

Thus, the scanning imaging lens is formed of the two scanning lenses 6 and 7.

The scanning lens 6 that is closer to the polygon mirror 5 is formed by resin molding so as to have a positive refracting power in the horizontal scanning direction, with a refracting power in the vertical scanning direction being zero or close to zero, and has a function of correcting the constant velocity characteristic in the optical scanning. The scanning lens 7 that is closer to the surface to be scanned has a weak refracting power in the horizontal scanning direction, and a strong positive refracting power in the vertical scanning direction.

In FIG. 1, reference sign GL denotes a soundproof glass (parallel plate glass) formed in a housing of the polygon mirror 5.

The linearity characteristic Lin of the scanning imaging lens formed of these scanning lenses 6 and 7 satisfies the condition (1).

In the optical scanner shown in FIG. 1, the polygon mirror 5 deflects an optical beam emitted from the light source 1 at a constant angular velocity, and the scanning imaging lens condenses the optical beams deflected on a surface to be scanned. The scanning imaging lens includes the scanning lens 6 that is closer to the polygon mirror 5 and the scanning lens that is closer to the surface to be scanned. The scanning lens 6 is formed by resin molding, and has a positive refracting power in the horizontal scanning direction, with zero or close to zero refracting power in the vertical scanning direction, and has a function of correcting a constant velocity characteristic in the optical scanning. The scanning lens 7 has a weak refracting power in the horizontal scanning direction and a strong positive refracting power in the vertical scanning direction. When it is assumed that a deflection angle of optical beams deflected by the polygon mirror 5 is $\theta$, an image height at the deflection angle $\theta$ of the light spot is $H(\theta)$, and an ideal image height at the deflection angle $\theta$ of the light spot is $k\theta$, designating k as a constant, the linearity Lin of the scanning imaging lens defined by $$Lin = [\{(dH(\theta)/d\theta)/k\} - 1] \times 100 (\%)$$

satisfies a condition $$2.0 < Lin < 10.0 (\%). \tag{1}$$

A lens thickness $X_1$ in the direction of optical axis on the optical axis, a thickness $X_{1e}$ of the thinnest portion, a lens height $T_1$ of only an optical surface in the vertical scanning direction, and a lens length $L_1$ of only the optical surface in the horizontal scanning direction of the first lens satisfy the following conditions, together with the effective write width $W_0$ on the surface to be scanned $$0.2 < |X_{1e}/X_1| < 0.4 \tag{2}$$

$$0.4 < |T_1/X_1| < 0.65 \tag{3}$$

$$0.3 < |L_1/W_0| < 0.5. \tag{4}$$

A lens thickness $X_1$ in the direction of optical axis on the optical axis, a thickness $X_{1e}$ of the thinnest portion, a lens height $T_1$ of only an optical surface in the vertical scanning direction, and a lens length $L_1$ of only the optical surface in the horizontal scanning direction of the second lens satisfy following conditions, together with the effective write width $W_0$ on the surface to be scanned $$0.5 < |X_{2e}/X_2| < 0.8 \quad (5)$$

$$0.2 < |X_2/T_2| < 0.5 \quad (6)$$

$$0.8 < |L_2/W_0| < 0.95. \quad (7)$$

A lateral magnification $\beta_0$ the vertical scanning direction on the optical axis between the deflection reflecting surface and the surface to be scanned, and a lateral magnification $\beta_h$ in the vertical scanning direction at an optional image height h satisfy a condition $$0.9 < |\beta_h/\beta_0| < 1.1. \quad (8)$$

The lateral magnification $\beta_0$ in the vertical scanning direction on the optical axis between the deflection reflecting surface and the surface to be scanned satisfies a condition $$0.2 < |\beta_0| < 0.6. \quad (9)$$

Among the scanning lenses 6 and 7, the scanning lens 6, which is closer to the deflection unit, has a positive refracting power in the horizontal scanning direction, but has no or little refracting power in the vertical scanning direction. The scanning lens 7, which is closer to the surface to be scanned, has a strong positive refracting power in the vertical scanning direction, but has a weak refracting power in the horizontal scanning direction. Therefore, when the scanning imaging lens includes such scanning lenses 6 and 7, as for a function of imaging a light spot on the surface to be scanned, the scanning lens 6 closer to the deflection unit (hereinafter, "scanning lens 6 on the deflection unit side") mainly takes charge of imaging function in the horizontal scanning direction, and the scanning lens 7 closer to the surface to be scanned (hereinafter, "scanning lens 7 on the scanned surface side") mainly takes charge of imaging function in the vertical scanning direction.

The scanning lens 6 on the deflection unit side has a function of correcting the constant velocity characteristic, but the constant velocity characteristic achieved by the scanning imaging lens is such that the linearity characteristic Lin is in the range of from 2 to 10%.

The deflection unit reflects the optical beams by the deflection reflecting surface, so that the optical beams are deflected at a constant angular velocity. Therefore, if it is assumed that a deflection angle by the deflection unit is "θ (setting 0 when the deflected optical beam becomes parallel with the optical axis of the scanning imaging lens)", when the constant velocity characteristic is ideally corrected by the scanning imaging lens, the "image height in the horizontal scanning direction" of the light spot with respect to the deflection angle theta (θ) is provided by k·θ, where k is a constant, and when the scanning imaging lens is a fθ lens (in which parallel optical beams are made to enter in the horizontal scanning direction, and a focal plane in the horizontal scanning direction agrees with the surface to be scanned), k=f.

If it is assumed that the actual image height of the light spot at a deflection angle θ is H(θ), the image height when the deflection angle changes by Δθ from the state of the deflection angle θ is H(θ+Δθ), and a change in the image height ΔH(θ) with respect to a change in the deflection angle Δθ is as described below:

$$\Delta H(\theta) = H(\theta + \Delta \theta) - H(\theta).$$

At this time, if the constant velocity characteristic is ideal, the ideal change in the image height of the light spot with respect to the change in the deflection angle Δθ becomes as follows:

$$k \cdot (\theta + \Delta \theta) - k \cdot \theta = k \cdot \Delta \theta.$$

When the ratio between ΔH(θ) and k·Δθ, ΔH(θ)/(k·Δθ), is 1 in the range of the deflection angle corresponding to the effective write width, within the limit where the change in the deflection angle Δθ becomes 0, the constant velocity characteristic of the scanning imaging lens is ideal.

A difference between the limit {(dH(θ)/dθ)/k} and 1 represents the constant velocity characteristic of the scanning imaging lens, and one obtained by expressing the absolute value thereof by percent is the linearity characteristic, Lin.

The linearity characteristic, Lin, becomes excellent as it approaches 0 in the range of the deflection angle corresponding to the effective write width. In the optical scanner according to the first aspect, this Lin is set to a range of from 2 to 10%.

As described above, the optical scanner according to the embodiment has a feature in which demands with respect to the linearity characteristic Lin, are relaxed to some extent.

By relaxing the demands with respect to the linearity characteristic Lin, other optical characteristics, for example, field curvature and wave front aberration can be easily corrected well.

Further, since the requirement with respect to the linearity characteristic is relaxed, the thickness and a thickness difference of the scanning lens 6 can be reduced.

If the upper limit of 10.0% in condition (1) is exceeded, the displacement quantity of the light spot at the time of writing one dot varies in optical scanning, resulting from deterioration in the constant velocity characteristic in the horizontal scanning, and hence the size of the dot to be written largely varies according to the image height. Further, if the lower limit of 2.0% is exceeded, the linearity characteristic becomes excellent, but the lens thickness on the deflection unit side increases, and a thickness difference between the central portion and the peripheral portion of the lens also increases. Therefore, when this scanning lens is molded, surface precision is likely to deteriorate, and refractive index distribution and striae are likely to occur inside the lens. Further, resulting from an increase in the thickness, the molding time and the resin material increases, thereby causing a cost increase.

In the optical scanner of the present invention, the scanning lens 6 has a positive refracting power in the horizontal scanning direction, to correct the constant velocity characteristic favorably. Further, since the scanning lens 7 has a weak refracting power in the horizontal scanning direction, the thickness of the lens can be equalized over the horizontal scanning direction, thereby being advantageous in machining.

The scanning lens 6 has zero or close to zero refracting power in the vertical scanning direction. Since this scanning lens hardly has a refracting power in the vertical scanning direction, the shape in the horizontal scanning cross section (a virtual plane cross section parallel with the optical axis and the horizontal scanning direction) does not substantially change in the vertical scanning direction. Therefore, even when the incident position of the optical beam entering into the scanning lens is shifted in the vertical scanning direction, the function of correcting the constant velocity characteristic of the scanning lens does not deteriorate. Further, deterioration in the imaging performance in the horizontal scanning direction is also suppressed.

The scanning lens 7 has a strong positive refracting power in the vertical scanning direction, and as a result, the imaging magnification of the scanning imaging lens in the vertical scanning direction can be made a reduction system. Accordingly, since variations in the imaging characteristics of the light spot in the vertical scanning direction due to an assembly error of parts and a form error of parts can be reduced by the reduction magnification, deterioration in the performance due to these errors can be effectively reduced.

The scanning lens 7 generally tends to become long, is difficult to ensure the thickness in the outermost peripheral portion (the edge portion) of the lens in the horizontal scanning direction (longitudinal direction), and is difficult to ensure the surface precision, because the flowability of the resin at the time of molding the lens deteriorates. However, in the optical scanner according to the first aspect, the scanning lens on the scanned surface side has "only a weak refracting power in the horizontal scanning direction", a thickness difference between the central portion and the peripheral portion of the lens in the longitudinal direction is small, and it is easy to ensure a sufficient thickness even in the outermost peripheral portion of the lens. As a result, deterioration in the surface precision due to deterioration in the flowability of the resin at the time of molding the lens can be effectively reduced, thereby enabling realization of excellent surface precision.

Further, the field curvature can be favorably corrected in the horizontal and vertical scanning directions, for example, by making the surface shape of the scanning lens 6 in the horizontal scanning direction non-circular arc, and the surface shape of other scanning lenses non-circular arc in the horizontal scanning direction, and by using a surface in which the radius of curvature in the vertical scanning cross section (a virtual plane cross section orthogonal to the horizontal scanning direction) is changed in the horizontal scanning direction, so that the centerline of curvature connecting in the horizontal scanning direction the center of curvature in the vertical scanning cross section becomes a curve different from the non-circular arc shape in the horizontal scanning direction in the horizontal scanning cross section.

In the optical scanner according to the embodiment, since the linearity characteristic Lin of the optical beams is sacrificed more or less, in order to concentrate on correction of field curvature and the like in the horizontal scanning direction, to perform designing in the horizontal scanning cross section, it can be suppressed that the scanning lens becomes thin and a deviation in the thickness occurs. As a result, an optical scanner having high surface precision, which can favorably correct field curvature in the horizontal and vertical scanning directions, and form a stable light spot having a small diameter, can be achieved at a low cost.

The optical beams emitted from the light source may be guided to the same surface to be scanned, to perform optical scanning by the multi-beam scanning method, or the optical beams may be guided to different surface to be scanned to perform optical scanning. Further, a plurality of surfaces to be scanned may be optically scanned by the multi-beam scanning method, respectively.

Thus, the scanning lens 6 has a large refracting power in the horizontal scanning direction, taking most of the function of correcting the linearity characteristic and field curvature in the horizontal scanning direction.

If the lower limit, 0.2, in condition (2) is exceeded, the "eccentricity of thickness (degree of thickness difference) between the central portion and the peripheral portion" of the scanning lens 6 increases, making it difficult to obtain a scanning lens having high surface precision (particularly, "shrinkage" is likely to occur in the peripheral portion of the lens). Further, since the eccentricity of. thickness is large, it is difficult to ensure a sufficient edge thickness, and the flowability of the resin at the time of molding deteriorates, thereby causing deterioration in the surface precision, and striae is likely to occur in the lens.

If the upper limit, 0.4, in condition (2) is exceeded, the scanning lens cannot perform the function of correcting the linearity sufficiently, and accompanying this, a range of magnification error on the image becomes large, and a large change in the dot diameter is likely to occur.

The optical scanner of the present invention can be used, for example, in the tandem-type image forming apparatus of the one-side scanning method, and of the scanning lenses constituting the scanning imaging lens, the scanning lens 6 can be shared by all the optical beams that optically scan different photosensitive materials. In this case, the scanning lens has a thick thickness in the vertical scanning direction, but this scanning lens can be used as a double lens described later.

As a result, the thickness in the vertical scanning direction of the individual lens superposed on each other of the double lens can be made thin. However, the thickness in the direction of optical axis becomes thicker than that in the vertical scanning direction (in the superposed direction). When these lenses are formed by resin. molding, cooling in the mold advances from the edge surface on the vertical scanning side having a thinner thickness.

In such a case, if the lower limit, 0.4 in condition (3) is exceeded, though the cooling time becomes short, the lens thickness in the direction of optical axis becomes thick relative to the lens height in the vertical scanning direction. As a result, refractive index distribution is likely to occur inside the lens, and transmittance thereof tends to deteriorate.

If the upper limit, 0.65 in condition (3) is exceeded, the lens height in the vertical scanning direction increases, and it becomes difficult to cool the lens in the mold, and as a result, the molding time increases. If the molding time is forcibly reduced, it will cause deterioration in the surface precision and a cost increase.

The condition (2) is an effective condition even when the scanning lens 6 is not shared by the optical beams that optically scan photosensitive materials (in this case, the height in the vertical scanning direction tends to become thinner than the thickness in the direction of optical axis).

In condition (4), if the upper limit, 0.3, is exceeded, the scanning lens is likely to shift toward the deflection unit side, thereby enlarging the optical magnification in the horizontal scanning direction, and as a result, deterioration in the field curvature resulting from the tolerance of lens shape is likely to occur. If the lower limit, 0.5, is exceeded, the scanning lens tends to have a large diameter, which interferes with ensuring the surface precision and achieving low cost.

By satisfying the conditions (2) to (4), an excellent scanning lens that can avoid the above problems can be achieved. Moreover, the scanning lens 7 has a relatively small refracting power in the horizontal scanning direction, but has a function of finely correcting the linearity characteristic that has not been corrected by the scanning lens 6, and finely correcting the field curvature in the horizontal scanning direction. Further, this scanning lens has a large refracting power in the vertical scanning direction, and has a role of correcting the field curvature in the vertical scanning direction.

In condition (5), if the lower limit, 0.5, is exceeded, the eccentricity of thickness between the central portion and the peripheral portion of the scanning lens in the longitudinal direction (in the horizontal scanning direction) increases, making it difficult to obtain a scanning lens having high surface precision (particularly, "shrinkage" is likely to occur in the peripheral portion of the lens). Further, it is difficult to ensure a sufficient edge thickness, and the flowability of the resin at the time of molding deteriorates, thereby causing deterioration in the surface precision, and striae in the lens.

In condition (5), if the upper limit, 0.8, is exceeded, it becomes difficult to correct a tiny higher-order component of the field curvature in the horizontal scanning direction.

The scanning lens 7 has a strong positive refracting power in the vertical scanning direction, and the scanning lens 6 side hardly has a refracting power in the vertical scanning direction. Therefore, scanning lens closest to the lens thickness in the vertical scanning direction is thicker than that in the direction of optical axis, in order to condense the optical beams on the surface to be scanned at a strong refracting power.

When such a scanning lens is molded by a resin, since cooling in the mold advances from the vertical scanning side having a thinner thickness, cooling from the direction of optical axis becomes predominant.

In condition (6), if the lower limit, 0.2, is exceeded, the cooling time decreases, but since the height in the vertical scanning direction becomes relatively high with respect to the lens thickness in the direction of optical axis, a bend of the scan line is likely to occur due to deterioration in the rigidity of the lens.

In condition (6), if the upper limit, 0.5, is exceeded, the lens thickness increases, and it becomes difficult to cool the lens. Therefore, the molding time increases, causing a cost increase. If the molding time is forcibly reduced, it will cause deterioration in the surface precision.

In condition (7), if the lower limit, 0.8, is exceeded, the scanning lens tends to move to the deflector side, and if the optical path is bent, the degree of freedom in the layout of the optical arrangement decreases, such as being likely to interfere with a folding mirror.

In condition (7), if the upper limit, 0.95, is exceeded, the scanning lens becomes long, thereby interfering with ensuring the surface precision and achieving a cost reduction.

By satisfying the conditions (5) to (7) at the same time, an excellent scanning lens that can dissolve the above problems can be achieved.

When the surface to be scanned is scanned by multi-beams by a plurality of optical beams at the same time, the beam pitch in the vertical scanning direction between the beams can be kept favorably, by substantially making the optical magnification constant over the whole image height, and as a result, an optical scanner that can correspond to high density and high speed by the multi-beams can be obtained.

If condition (8) is satisfied, since the diameter of the beam waist can be kept constant in the vertical scanning direction, when the field curvature is also corrected favorably, a small-diameter light spot stable over the whole image height can be achieved. As a result, an excellent image having little difference in density, and excellent tone and dot stability can be provided.

The scanning imaging lens is formed of a plurality of scanning lenses, but when the scanning imaging lens is formed of two scanning lenses, equalization of magnification in the vertical scanning direction over the whole image height can be achieved by making at least two lens surfaces non-circular arc in the horizontal scanning cross section, in which a radius of curvature in the vertical scanning cross section is changed in the horizontal scanning direction so that the centerline of the curvature connecting the center of curvature in the vertical scanning cross section in the horizontal scanning direction becomes a curve different from the non-circular arc shape in the horizontal scanning direction, in the horizontal scanning cross section, and bending these two lens surfaces to adjust the center to center position in the vertical scanning direction.

If the lower limit 0.2 in condition (9) is exceeded, it is necessary to set the opening diameter of the aperture for beam forming to be small, as compared with an instance when the lateral magnification in the vertical scanning direction on the optical axis between the deflection reflecting surface and the surface to be scanned is set to be large, with respect to an aimed spot diameter. As a result, there are problems such as insufficient light quantity, and deterioration in spot shape due to the influence of diffraction in the aperture.

If the upper limit 0.6 in condition (9) is exceeded, in the case of tandem-type image forming apparatus, it is necessary to extend the whole optical path length in order to arrange a mirror for separating the optical path of the optical beams having passed through the scanning lens 6, toward the respective photosensitive materials, thereby causing enlargement of the apparatus, or layout in the optical scanner becomes difficult.

EXAMPLES

Two specific examples of the optical system shown in FIG. 1 will be described below.

Signs used in the examples are as follows.

RY: Radius of curvature in the horizontal scanning direction

RZ: Radius of curvature (lens center) in the vertical scanning direction

N: Refractive index in used wavelength (655 nanometers)

X: Distance in the direction of optical axis

Example 1

Data of the optical system on the optical path from the light source to the polygon mirror is shown in Table 1.

TABLE 1

| Surface Number | RY(mm) | RZ(mm) | X(mm) | N | Note |
|---|---|---|---|---|---|
| 0 | — | — | −3.944 | — | Semiconductor laser |
| 1 | ∞ | ∞ | 0.3 | 1.51 | Cover glass |
| 2 | ∞ | ∞ | 20.0 | — | |
| 3 | | | 4.5 | 1.6935 | Coupling lens |
| 4* | −18.486 | −18.486 | 15.0 | — | |
| 5 | ∞ | ∞ | 100 | — | Aperture |
| 6 | ∞ | 48.0 | 3.0 | 1.5168 | Cylindrical lens |
| 7 | ∞ | ∞ | 93.57 | — | — |
| 8 | — | — | — | — | Deflection reflecting surface |

The opening width of the aperture is 5.6 millimeters in the horizontal scanning direction, and 0.64 millimeters in the vertical scanning direction. The surface number with "*"

mark is a coaxial aspheric surface. The numerical data relating to the aspheric surface is not shown, but the wave front aberration of the optical beams emitted from the coupling lens is favorably corrected.

The polygon mirror is such that the radius of inscribed circle is 18 millimeters and the number of deflection reflecting surfaces is 6. The incident angle (an angle formed between the principal ray of the optical beams to be deflected when it is orthogonal to the surface to be scanned, and the principal ray of optical beams entering from the light source side) is 60 degrees.

Data of the optical system between the polygon mirror and the surface to be scanned is shown in Table 2.

$\beta_0$ (vertical scanning magnification between the deflection unit and surface to be scanned): 0.38

$\beta_h/\beta_0$: 0.98 (value at an image height having the largest magnification difference from the image height at the center)

TABLE 2

| Surface Number | RY (mm) | RZ (mm) | X (mm) | N | Note |
|---|---|---|---|---|---|
| 0 | ∞ | ∞ | 77.93 | — | Deflection reflecting surface |
| 1* | −696.8 | ∞ | 17.07 | 1.5305 | Scanning lens |
| 2* | −118.882 | ∞ | 171.5 | — | |
| 3** | 2709.20 | −27.296 | 3.5 | 1.5305 | Scanning lens |
| 4** | 2167.36 | −16.495 | 100.0 | — | |
| 5 | — | — | — | — | Surface to be scanned |

The shape of the lens surface is provided by the following equation.

$$X(Y,Z) = Y^2 \cdot Cm / \{1 + [1 - (1+K) \cdot (Y \cdot Cm)^2]\} + A \cdot Y^4 + B \cdot Y^6 + C \cdot Y^8 + D \cdot Y^{10} + E \cdot Y^{12} + F \cdot Y^{14} + Cs(Y) \cdot Z^2 / \{1 + [1 - (Cs(Y)) \cdot (Z)^2]\} \quad (1),$$

where, $Cm = 1/RY$, and $$Cs(Y) = (1/RZ) + a \cdot Y + b \cdot Y^2 + c \cdot Y^3 + d \cdot Y^4 + e \cdot Y^5 + f \cdot Y^6 + g \cdot Y^7 + h \cdot Y^8 + i \cdot Y^9 + j \cdot Y^{10} + k \cdot Y^{11} + l \cdot Y^{12} \quad (2).$$

In equation (1), the first line and the second line on the right side provide a known non-circular arc shape.

The shape data of the respective lens surfaces in the optical system between the polygon mirror and the surface to be scanned is shown in Table 3.

TABLE 3

| | First surface | Second surface | Third surface | Fourth surface |
|---|---|---|---|---|
| RY | −696.8 | −118.88 | 2709.2 | 2167.4 |
| K | 1.1764E+02 | 2.1136E+00 | −5.5639E+23 | −9.6122E+02 |
| A | −1.2398E−07 | 5.7148E−08 | −5.5150E−09 | −1.7564E−09 |
| B | 3.7031E−11 | 2.8529E−11 | 3.1396E−13 | −4.5995E−13 |
| C | 3.5715E−15 | 6.6969E−15 | 1.0070E−17 | 8.4327E−19 |
| D | 2.7486E−19 | 1.2031E−18 | 2.0204E−22 | 5.3773E−22 |
| E | −1.4610E−23 | 1.8696E−22 | 6.9833E−27 | 2.3714E−26 |
| F | −2.5118E−26 | −8.2308E−28 | | |
| RZ | ∞ | ∞ | −27.495 | −16.495 |
| a | — | — | — | −3.5150E−08 |
| b | — | — | 5.2106E−06 | 5.0773E−06 |
| c | — | — | — | −5.6045E−11 |
| d | — | — | −1.7519E−10 | −1.8382E−10 |
| e | — | — | — | 6.6114E−15 |
| f | — | — | −4.8585E−15 | −1.3155E−15 |
| g | — | — | — | −7.9660E−19 |
| h | — | — | 3.2796E−19 | 1.3928E−19 |
| i | — | — | — | 6.5799E−23 |
| j | — | — | 2.2796E−23 | 1.6289E−23 |

TABLE 3-continued

| | First surface | Second surface | Third surface | Fourth surface |
|---|---|---|---|---|
| k | — | — | — | −2.0341E−27 |
| l | — | — | −4.2670E−26 | 1.0237E−28 |

As is obvious from Table 3, the first and second surfaces with "*" mark (see Table 2) (respective surfaces of the scanning lens on the polygon mirror side) have a non-circular arc shape in the horizontal scanning cross section, and has no curvature (radius of curvature: ∞) in the vertical scanning direction.

The third and fourth surfaces with "**" mark have a non-circular arc shape in the horizontal scanning cross section, and the radius of curvature: $1/Cs(Y)$ in the vertical scanning direction continuously changes according to equation (2), corresponding to the lens height (lens height Y in the horizontal scanning direction).

The soundproof glass GL shown in FIG. 1 is a parallel plate glass (refractive index: 1.51) having a thickness of 1.9 millimeters, and is arranged inclined by 8 degrees with respect to the vertical scanning direction.

In Example 1, respective parameters in the above conditions are as follows. The unit of length is millimeters.

Linearity characteristic: $|Lin| = 5.7\%$ $X_1 = 17.07$, $X_{1e} = 5.7$, $T_1 = 10.5$, $L_1 = 122$, $W_0 = 300$, $|X_{1e}/X_1| = 0.33$, $|T_1/X_1| = 0.62$, $|L_1, W_0| = 0.41$, $X_2 = 3.5$, $X_{2e} = 2.8$, $T_2 = 7.5$, $L_2 = 268$, $|X_{2e}/X_2| = 0.80$, $|X_2/T_2| = 0.47$, $|L_2/W_0| = 0.89$.

EXAMPLE 2

Data of the optical system on the optical path from the light source to the polygon mirror is the same as those in Example 1.

Data of the optical system between the polygon mirror and the surface to be scanned is shown in Tables 4 and 5, as in Example 1.

$\beta_0$ (vertical scanning magnification between the deflection unit and surface to be scanned): 0.36

$\beta_h/\beta_0$: 0.97 (value at an image height having the largest magnification difference from the image height at the center)

TABLE 4

| Surface Number | RY(mm) | RZ(mm) | X(mm) | N | Note |
|---|---|---|---|---|---|
| 0 | ∞ | ∞ | 75.19 | — | Deflection reflecting surface |
| 1* | −895.617 | ∞ | 21.51 | 1.527 | Scanning lens |
| 2* | −123.584 | ∞ | 175.99 | — | |
| 3** | −701.445 | 27.064 | 3.71 | 1.527 | Scanning lens |
| 4** | −719.598 | 93.082 | 93.5 | — | |
| 5 | — | — | — | — | Surface to be scanned |

TABLE 5

|    | First surface | Second surface | Third surface | Fourth surface |
|----|---------------|----------------|---------------|----------------|
| RY | −895.617      | −123.584       | −701.445      | −719.596       |
| K  | 1.122E+02     | 2.028E−00      | −6.432E−01    | −1.224E+12     |
| A  | −1.506E−7     | 3.159E−08      | 8.123E−08     | 4.983E−08      |
| B  | 4.353E−11     | 3.164E−11      | −2.716E−12    | −8.062E−13     |
| C  | −7.340E−15    | −1.051E−15     | −7.289E−17    | −1.616E−16     |
| D  | −8.802E−19    | 7.556E−19      | 1.075E−21     | 1.655E−21      |
| E  | 1.750E−22     | 5.955E−23      | 1.245E−25     | 1.642E−25      |
| F  | −8.111E−26    | −7.268E−26     | —             | —              |
| RZ | ∞             | ∞              | 27.064        | 93.082         |
| a  | —             | —              | —             | −2.56E−07      |
| b  | —             | —              | −1.748E−07    | 1.043E−07      |
| c  | —             | —              | —             | 3.147E−10      |
| d  | —             | —              | −2.918E−12    | 8.517E−12      |
| e  | —             | —              | —             | −1.301E−13     |
| f  | —             | —              | 1.775E−15     | −1.148E−15     |
| g  | —             | —              | —             | 2.067E−17      |
| h  | —             | —              | −8.903E−20    | 1.759E−19      |
| i  | —             | —              | —             | −1.435E−21     |
| j  | —             | —              | 1.050E−23     | −4.041E−24     |
| k  | —             | —              | —             | 3.621E−26      |
| l  | —             | —              | −9.913E−28    | −6.270E−28     |

As is obvious from Table 5, the first and second surfaces with "*" mark (see Table 2) (respective surfaces of the scanning lens on the polygon mirror side) have a non-circular arc shape in the horizontal scanning cross section, and has no curvature (radius of curvature: ∝) in the vertical scanning direction.

The third and fourth surfaces with "**" mark have a non-circular arc shape in the horizontal scanning cross section, and the radius of curvature: 1/Cs(Y) in the vertical scanning direction continuously changes according to equation (2), corresponding to the lens height (lens height Y in the horizontal scanning direction).

The soundproof glass GL shown in FIG. 1 is a parallel plate glass (refractive index: 1.51) having a thickness of 1.9 millimeters, and is arranged inclined by 8 degrees with respect to the vertical scanning direction.

In Example 2, respective parameters in the above conditions are as follows. The unit of length is millimeters.

Figure 2:
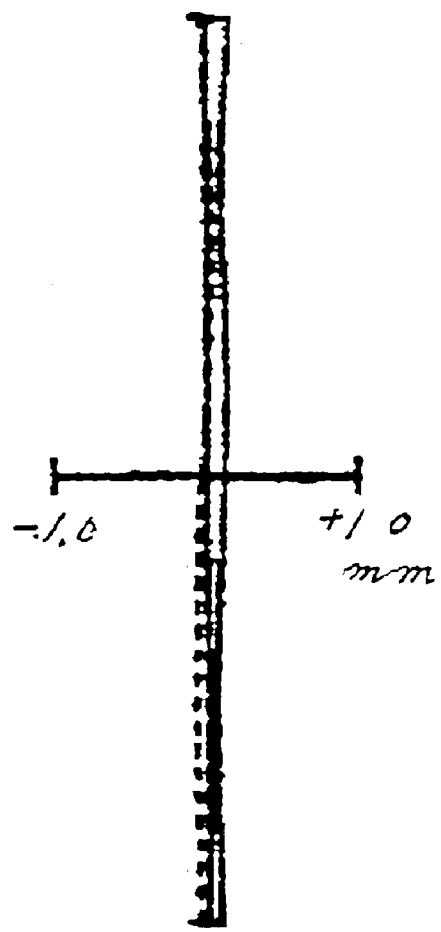
FIG. 2 illustrates field curvature and constant velocity characteristic relating to Example 1.
Figure 2:
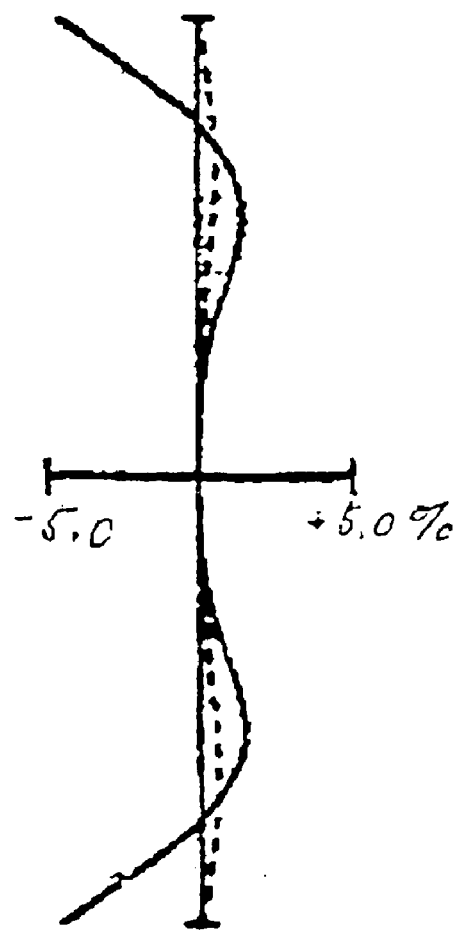
Figure 3:
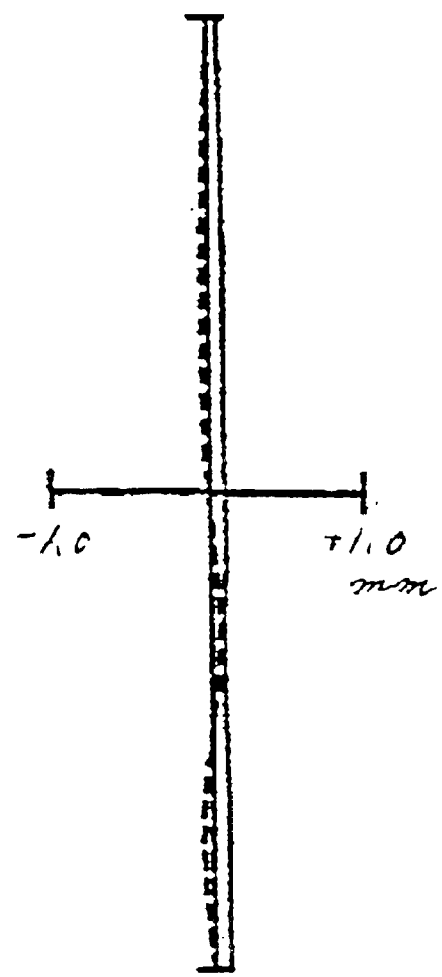
FIG. 3 illustrates field curvature and constant velocity characteristic relating to Example 2.
Figure 3:
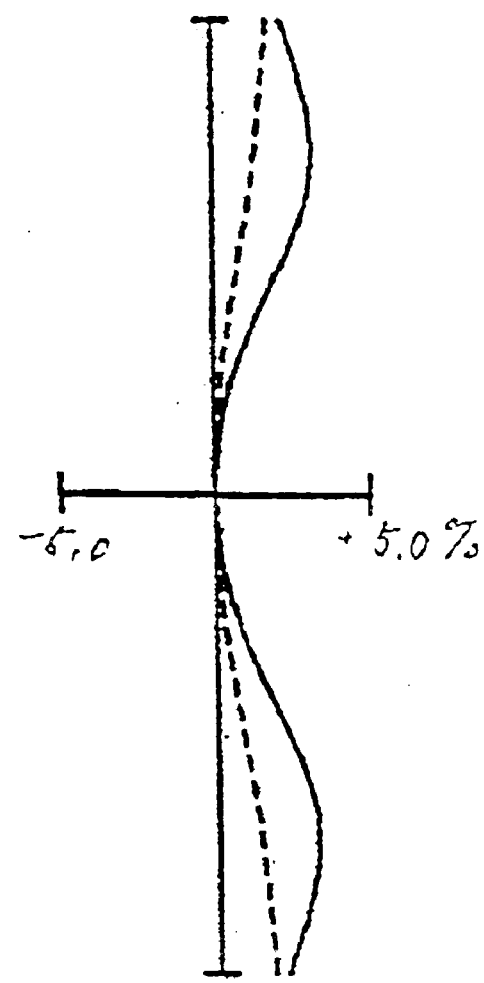

Linearity characteristic: $|\text{Lin}|=3.5\%$ $X_1=21.51, X_{1e}=7.18, T_1=10, L_1=128, W_0=300, |X_{1e}/X_1|=0.33, |T_1/X_1|=0.46, |L_1/W_0|=0.43, X_2=3.71, X_{2e}=2.87, T_2=9, L_2=276, |X_{2e}/X_2|=0.77, |X_2/T_2|=0.41, |L_2/W_0|=0.9.$ FIG. 2 illustrates field curvature and constant velocity characteristic relating to Example 1. FIG. 3 illustrates field curvature and constant velocity characteristic relating to Example 2. In the figure expressing the field curvature (left-hand figures in FIGS. 2 and 3), the broken line indicates the field curvature in the horizontal scanning direction, and the actual line indicates the field curvature in the vertical scanning direction. Further, in the figure indicating the constant velocity characteristic (right-hand figures in FIGS. 2 and 3), the broken line indicates the fθ characteristic, and the actual line indicates the linearity characteristic.

In Example 1, the linearity characteristic Lin has the maximum value of 5.7%, and in Example 2, the linearity characteristic Lin has the maximum value of 3.5%, and respectively satisfy the condition (1). The linearity characteristics Lin=5.7% and 3.5% in Examples 1 and 2 are slightly excessive with respect to the value required generally in the optical scanner, but the field curvature is considerably favorably corrected both in Examples 1 and 2, since the requirement with respect to the linearity characteristic is relaxed.

The field curvature in Example 1 is 0.102 millimeter (−0.077 to 0.025) in the horizontal scanning direction, and 0.085 millimeter (−0.0059 to 0.144) in the vertical scanning direction, and the field curvature in Example 2 is 0.117 millimeter (−0.057 to 0.006) in the horizontal scanning direction, and 0.030 millimeter (−0.078 to 0.108) in the vertical scanning direction.

Figure 4A:
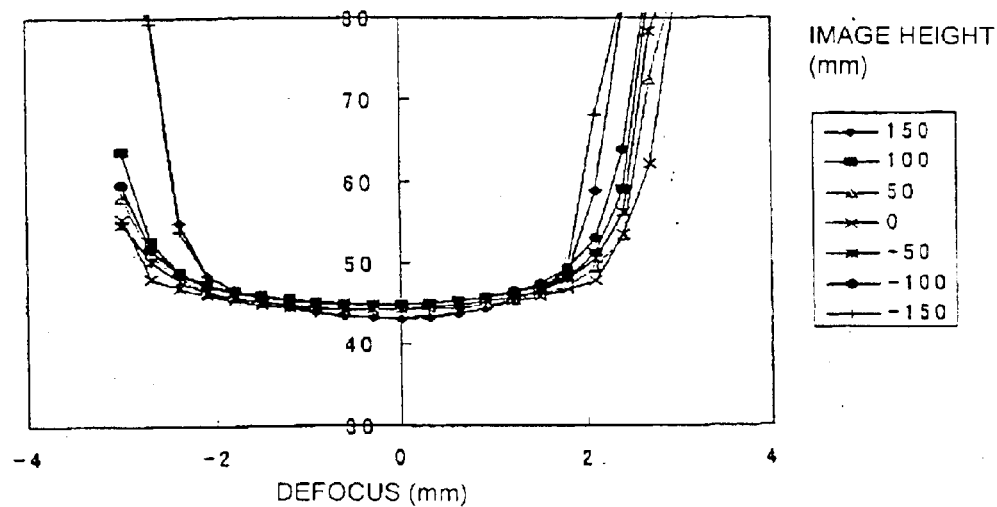
FIG. 4A illustrates a change in a spot diameter in a horizontal scanning direction due to defocus relating to the Example 1, using an image height as a parameter.
Figure 4B:
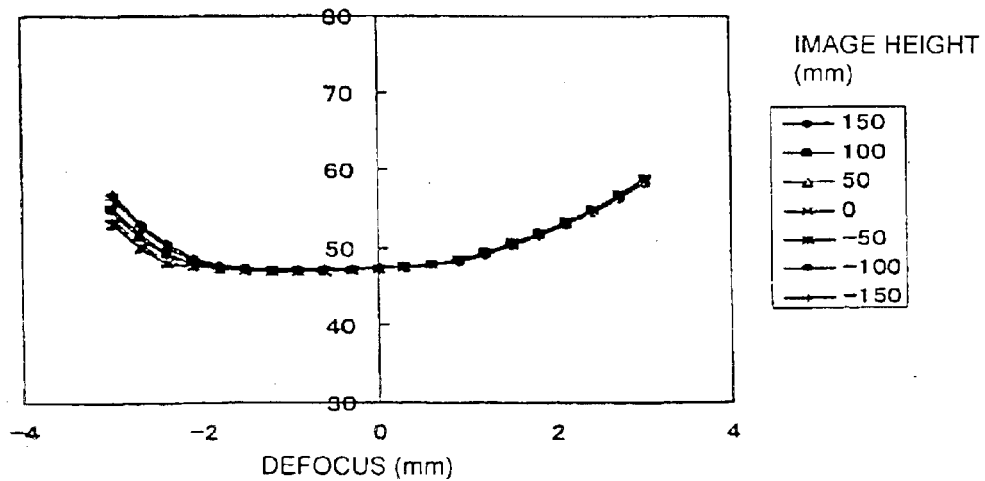
FIG. 4B illustrates a change in a spot diameter in a vertical scanning direction due to defocus relating to the Example 1, using an image height as a parameter.
Figure 5A:
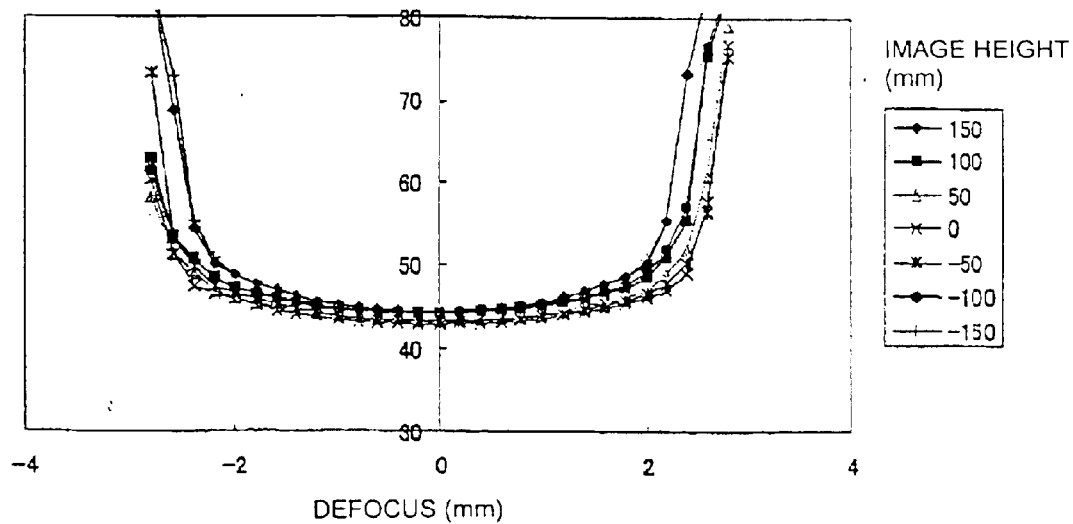
FIG. 5A illustrates a change in a spot diameter in a horizontal scanning direction due to defocus relating to the Example 2, using an image height as a parameter.
Figure 5B:
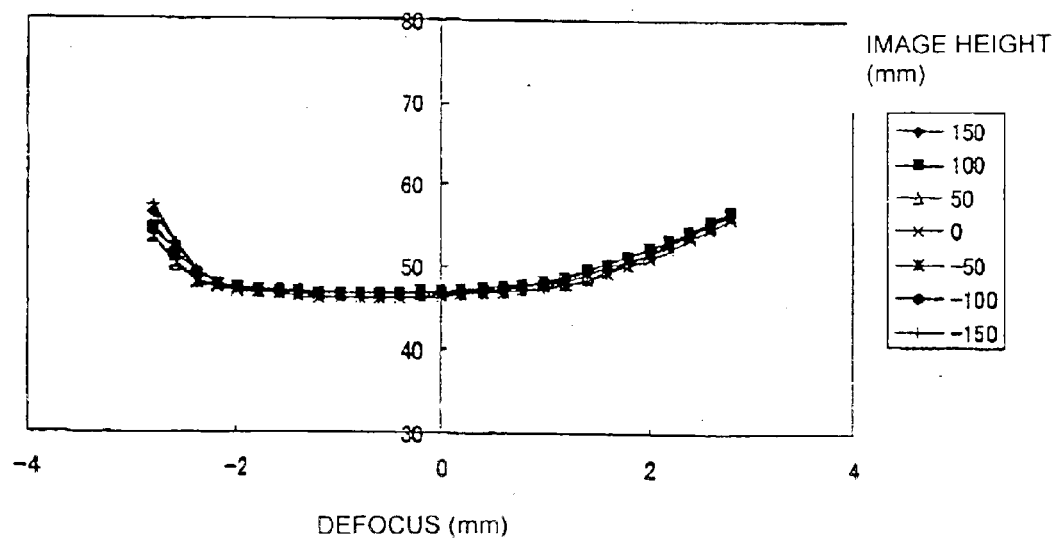
FIG. 5B illustrates a change in a spot diameter in a vertical scanning direction due to defocus relating to the Example 2, using an image height as a parameter.

FIG. 4A illustrates a change in a spot diameter in a horizontal scanning direction due to defocus relating to the Example 1, using an image height as a parameter and FIG. 4B illustrates a change in a spot diameter in a vertical scanning direction due to defocus relating to the Example 1, using an image height as a parameter. FIG. 5A illustrates a change in a spot diameter in a horizontal scanning direction due to defocus relating to the Example 2, using an image height as a parameter and FIG. 5B illustrates a change in a spot diameter in a vertical scanning direction due to defocus relating to the Example 2, using an image height as a parameter.

As is obvious from FIGS. 4A, 4B, 5A, and 5B, a light spot having a small diameter and stable between respective image heights is achieved both in Examples 1 and 2.

In Examples 1 and 2, the scanning lenses 6 and 7 constituting the scanning imaging lens are formed by resin molding. The conditions (2), (3), and (4) relating to the scanning lens 6 closest to the deflection unit are satisfied both in Examples 1 and 2, and the conditions (5), (6), and (7) relating to the scanning lens 7 closest to the surface to be scanned are satisfied both in Examples 1 and 2.

The parameter $|\beta_h/\beta_0|$ in condition (8) according to the seventh aspect, and the parameter $\beta_0$ in condition (9) according to the eighth aspect are such that $|\beta_h/\beta_0|=0.98$ and $\beta_0=0.38$ respectively in Example 1, and $|\beta_h/\beta_0|=0.97$ and $\beta_0=0.36$ respectively in Example 2, and hence Examples 1 and 2 satisfy the conditions (8) and (9).

In Examples 1 and 2, the optical beams emitted from the light source 1 are formed into parallel luminous flux by the coupling lens 2, but the positive refracting power held by the scanning lens 6 can be decreased by forming the optical beams into luminous flux having slight convergence, thereby enabling a thinner scanning lens 6.

However, if the convergence of the optical beams is made too strong, fluctuation due to a difference in the inscribed circle on the respective reflecting surfaces of the polygon mirror is likely to occur.

As explained above, in the optical scanner according to the optical system in Examples 1 and 2, by slightly sacrificing the linearity characteristic, other optical characteristics such as field curvature are favorably corrected. When the linearity characteristic increases as in Examples 1 and 2, it becomes a problem when an image is to be formed, in which a magnification error (a deviation from the aimed ideal scan length) in the horizontal scanning direction is large and equal magnification is required, particularly such as a computer aided design (CAD) drawing.

In order to avoid such a problem due to insufficient linearity characteristic, a modulation-variable mechanism is used to change the timing of the modulation signal of the light source, so that the linearity characteristic Lin can be corrected.

For example, at the time of assembly of the optical scanner, optical detection sections are provided at equal Intervals at a plurality of image height positions, to measure the scanning time at which the optical beam crosses between the optical detection sections, by a counter circuit. A variation amount of the measured scanning time is stored in a memory in the apparatus. After the optical scanner is mounted in the image forming apparatus, by changing the light emission timing at the time of modulating the light source based on the data stored in the memory, the dot position of a latent image formed on the photosensitive medium can be favorably corrected.

Alternatively, a dot misregistration on an intermediate transfer belt or the like may be directly measured at the time of power on of the image forming apparatus body or intermittently, and the light emission timing may be changed at the time of modulating the light source, so as to correct a deviation from an ideal position.

The modulation-variable mechanism may include a driver that drives a semiconductor laser, being a light source, a signal input unit that applies a modulation signal corresponding to an image signal to the driver, and an adjustment unit that variably adjusts the input timing of the image signal by the signal input unit.

Figure 6:
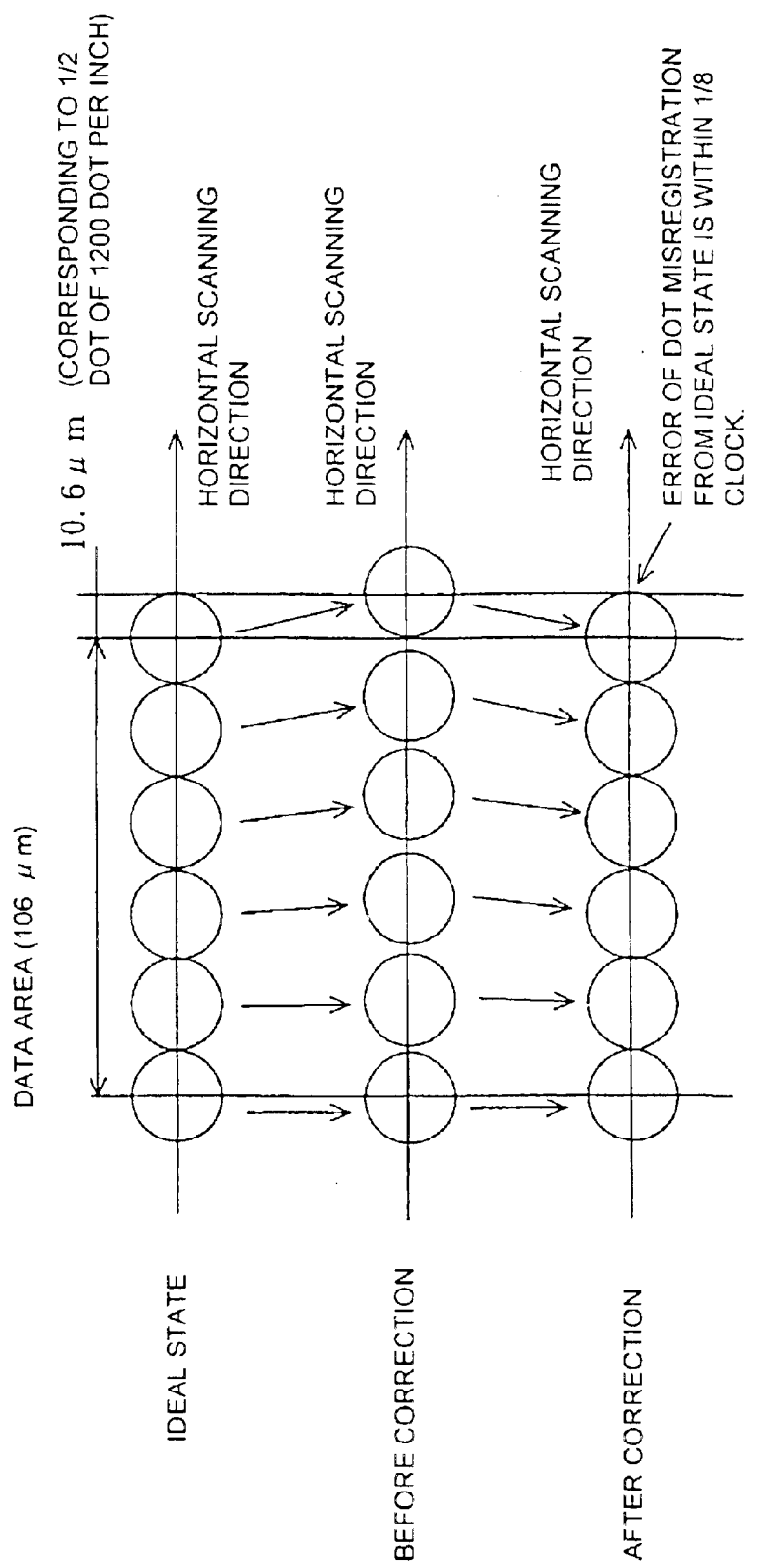
FIG. 6 is a diagram for explaining the concept of the present invention.
Figure 7:
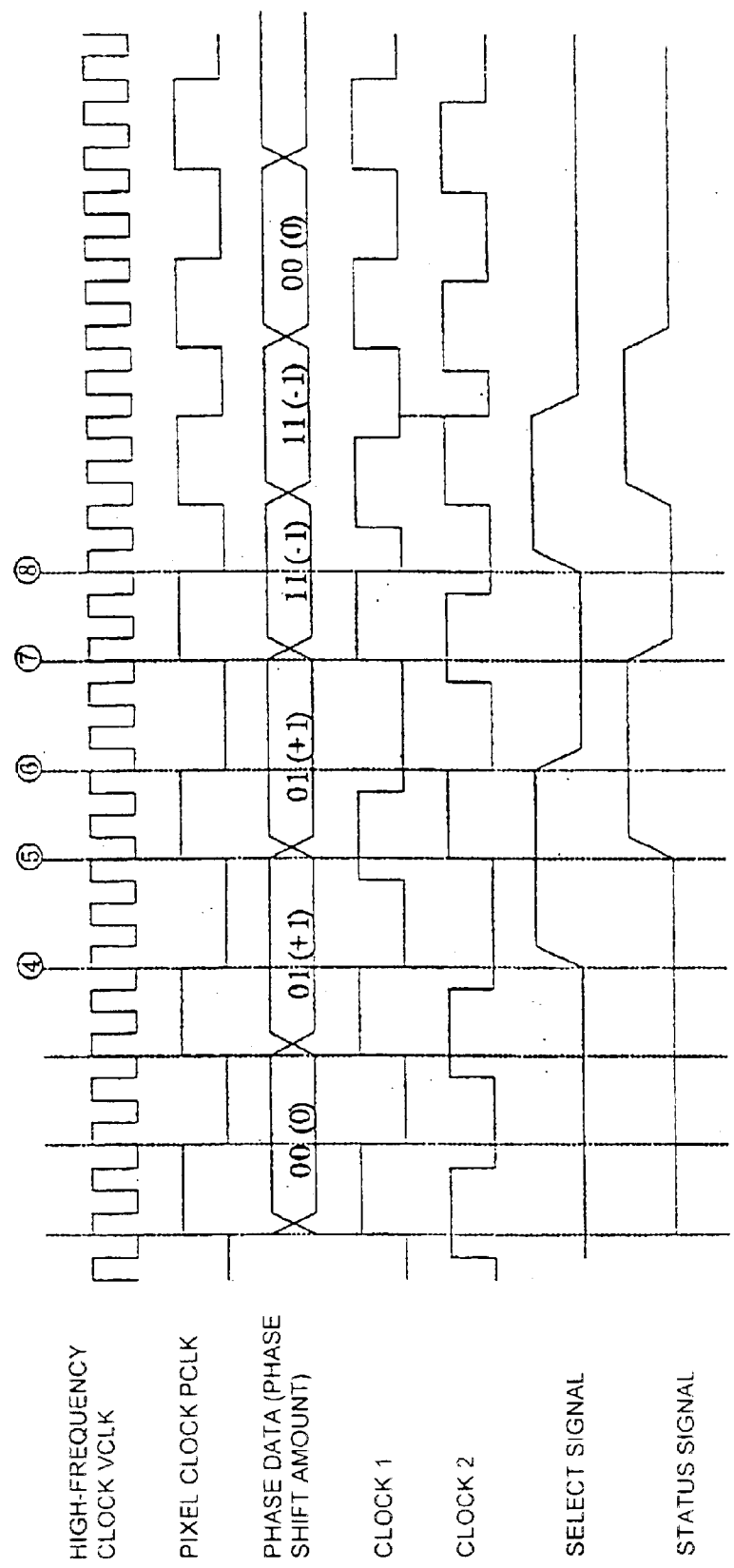
FIG. 7 is another diagram for explaining the concept of the present invention.

An example in which the modulation-variable mechanism performs phase shift of a pixel clock based on a high-frequency clock higher than the pixel clock, to thereby correct the linearity characteristic (the third aspect) is explained, with reference to FIGS. 6 and 7.

The uppermost stage in FIG. 6 illustrates the "ideal state" when six dots are written in a data area of 106 micrometers by a light spot. The middle stage indicates a state in which the positions of six dots are shifted due to insufficient correction of the linearity characteristic, and the bottom stage indicates a state in which the state in the middle stage is corrected by the modulation-variable mechanism.

This correction can be executed by "performing phase shift of the pixel clock based on a high-frequency clock higher than the pixel clock".

In FIG. 7, the uppermost stage indicates a high-frequency clock, VCLK. Here, an example in which a pixel clock, PCLK (the second stage from the top in FIG. 7) corresponding to four divided frequencies of VCLK is generated, and shifted by "+⅛PCLK" or "−⅛PCLK" as phase shift is explained.

The correspondence between phase data provided from outside and the phase shift quantity is as described below.

| Phase shift quantity | Phase data |
|---|---|
| 0 | 00 |
| +1/8PCLK | 01 |
| −1/8PCLK | 11 |

The third stage from the top in FIG. 7 indicates the phase shift quantity and the situation of switching clock 1 and clock 2.

At first, the "state in which clock 1 is selected by a multiplexer" as an initial state. Phase data "00" is provided (1) synchronously with PCLK. Since the phase data bit0 is zero, the select signal remains 0, and is output as PCLK, with clock 1 selected (2). As a result, PCLK becomes the clock of "phase shift quantity: 0".

Subsequently, "01" is provided as phase data (3). In this case, since the phase data bit0 is zero, the select signal is toggled as "1" at the trailing edge of PCLK, so as to select clock 2 and output it as PCLK (4). The clock 2 at this time becomes a "clock in which the cycle becomes long by 1 VCLK", as shown in the figure.

In this manner, PCLK in which phase shift is performed by "+⅛ PCLK is obtained.

When "01" is provided as the phase data (5), since the phase data bit0 is 1, the select signal is toggled as "0" at the trailing edge of PCLK, so as to select clock 1 and output it as PCLK (6). The clock 1 at this time becomes a "clock in which the cycle becomes long by 1 VCLK", as shown in the figure.

"11" is then provided as the phase data (7). Since the phase data bit0 is 1, the select signal is toggled as "1" at the trailing edge of PCLK, so as to select clock 2 as "1" and output it as PCLK (8). The clock 1 at this time becomes a "clock in which the cycle becomes long by 1 VCLK", as shown in the figure. As a result, PCLK in which phase shift is performed by "−⅛ PCLK is obtained.

As described above, the cycle of the clocks 1 and 2 is changed according to the phase data, to switch clock 1 and clock 2 and output it as PCLK. As a result, a pixel clock PCLK phase-shifted at ⅛ PCLK step can be obtained. By a configuration in which data from outside is set in a phase data memory circuit, so that the phase data is sequentially output synchronously with the pixel clock PCLK, phase data for correcting a fluctuation in the dot position occurring due to the linearity characteristic Lin of the scanning imaging lens (which becomes the same phase data for optical scanning of the respective scan lines) is stored beforehand in the phase data memory circuit, and every time the scan line is optically scanned, the phase data in the phase data memory circuit is sequentially output. As a result, it is not necessary to output the same data for each line from outside.

Figure 8:
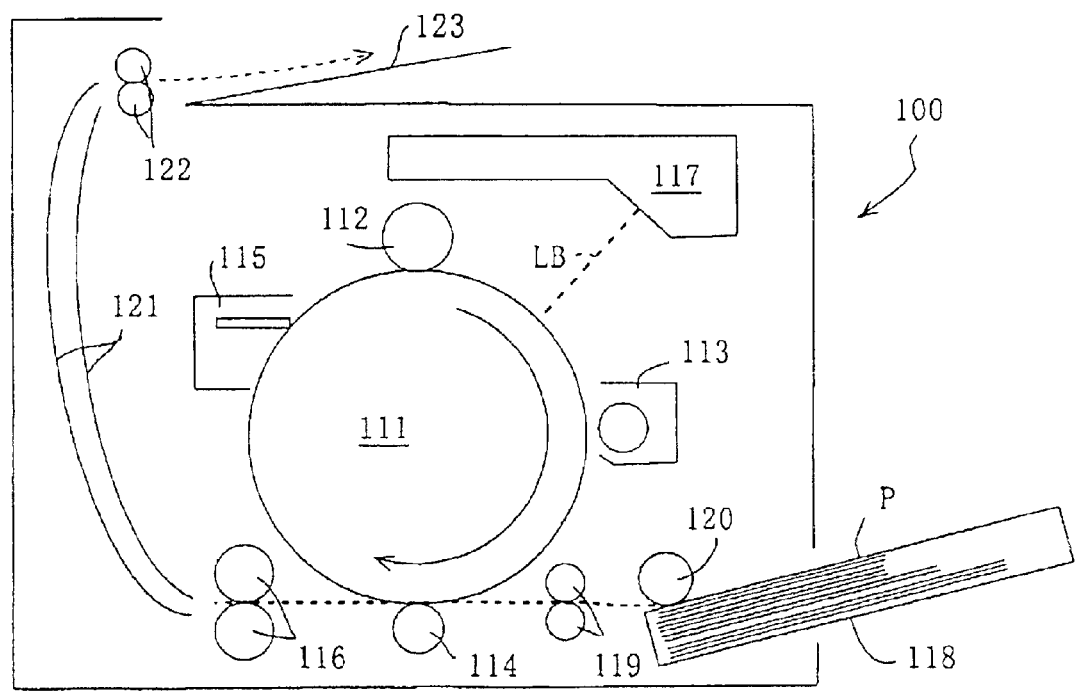
FIG. 8 is a side view of the image forming apparatus according to the embodiment.

FIG. 8 is a side view of the image forming apparatus according to the embodiment. The image forming apparatus is a monochrome optical printer.

The optical printer 100 has a "photoconductive photosensitive material (photosensitive drum) formed in a cylindrical shape" as a photosensitive medium 111. A charging roller 112 as a charging unit, a development apparatus 113, a transfer roller 114, and a cleaning unit 115 are respectively arranged around the photosensitive drum 111. A corona charger can be used as the charging unit. Further, an optical scanner 117 that performs optical scanning by an optical beam LB is provided, so as to perform exposure by optical write between the charging roller 112 and the development apparatus 113.

In FIG. 8, reference sign 116 denotes a fixing apparatus, 118 denotes a cassette, 119 denotes a resist roller pair, 120 denotes a paper feed roller, 121 denotes a feed path, 122 denotes a paper discharge roller pair, 123 denotes a tray, and P denotes transfer paper as a sheet-form recording medium.

When image formation is performed, the photosensitive drum 111 is rotated clockwise at a constant velocity, the surface thereof is uniformly charged by the charging roller 112, and an electrostatic latent image is formed by the exposure of optical write by the optical beam LB of the optical scanner 117. The formed electrostatic latent image is a so-called negative latent image, and the image portion has been exposed.

The electrostatic latent image is reverse-developed by the development apparatus 113, to form a toner image on the photosensitive drum 111.

The cassette 118 storing the transfer paper P is detachable to the body of the image forming apparatus 100, and in the attached state as shown in the figure, one sheet at the uppermost position of the stored transfer paper P is fed by the paper feed roller 120. The fed transfer paper P is caught by the resist roller pair 119 at the edge thereof. The resist roller pair 119 sends the transfer paper P to the transfer section at a timing synchronous with the shift of the toner image to the transfer position. The toner image is superposed on the sent transfer paper P in the transfer section, and the toner image is electrostatically transferred thereon by the action of the transfer roller 114.

The transfer paper P on which the toner image is transferred is sent to the fixing apparatus 116, where the toner image is fixed, and passes through the feed path 121, and is discharged onto the tray 123 by the paper discharge roller pair 122.

The surface of the photosensitive drum 111 after transfer of the toner image is cleaned by the cleaning unit 115, to remove residual toner and paper dust.

Excellent image formation can be achieved by using the one shown in Examples 1 and 2, whose optical arrangement thereof is shown in FIG. 1, as the optical scanner, and "correcting the linearity characteristic by the modulation-variable mechanism (the ninth and the tenth aspect).

Figure 9A:
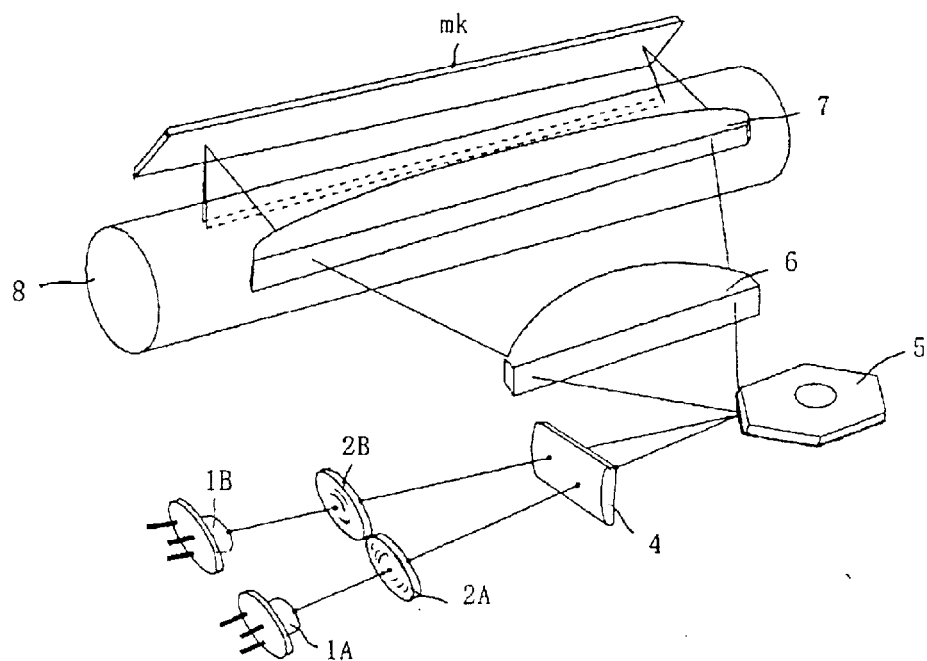
FIG. 9A is a perspective of the optical arrangement according to the embodiment.

An instance of optical scanning by the single-beam scanning method has been explained above, but the optical scanner of the present invention can be also constructed so as to perform the multi-beam scanning method. FIG. 9A is a perspective of the optical arrangement of multi-beam scanning type according to the embodiment. The optical scanner 117 in the image forming apparatus in FIG. 8 can be constructed as shown in FIG. 9A.

In FIG. 9A, a plurality of optical beams (two optical beams) emitted from semiconductor lasers 1A and 1B, being a light source, are formed into parallel luminous flux, respectively, by coupling lenses 2A and 2B, imaged by the cylindrical lens 4, as a line image long in the horizontal scanning direction at the same position of the "deflection reflecting surface" of the polygon mirror 5, being the deflection unit, and deflected at a constant angular velocity, by equal velocity rotation of the polygon mirror.

These two deflected optical beams transmit through the scanning lenses 6 and 7 constituting the scanning imaging lens, with the optical path folded back by an optical path folding mirror mk, guided to the photoconductive photosensitive drum 8 forming the actual state of the surface to be scanned, and gathered as "two light spots separated from each other in the vertical scanning direction" on the photosensitive drum 8, to thereby optically scan the two scan lines at the same time. As shown in FIG. 9A, the respective optical beams from the semiconductor lasers 1A and 1B cross each other in the horizontal scanning direction in the vicinity of the deflecting surface of the polygon mirror 5, being the deflection unit (the fourth aspect).

Figure 9B:
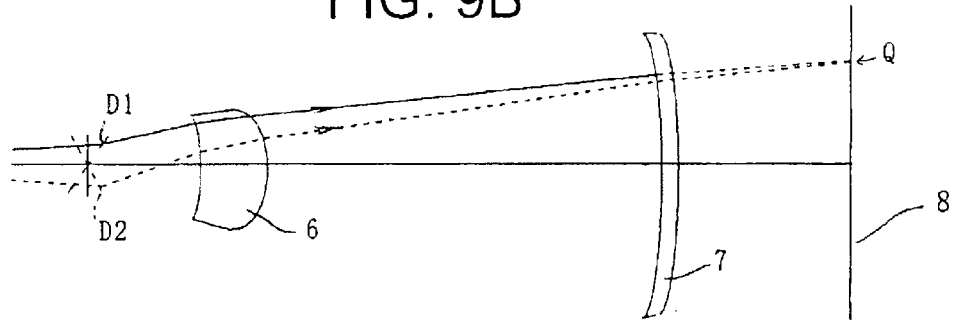
FIGS. 9B and 9C are side views of the optical arrangement according to the embodiment.
Figure 9C:
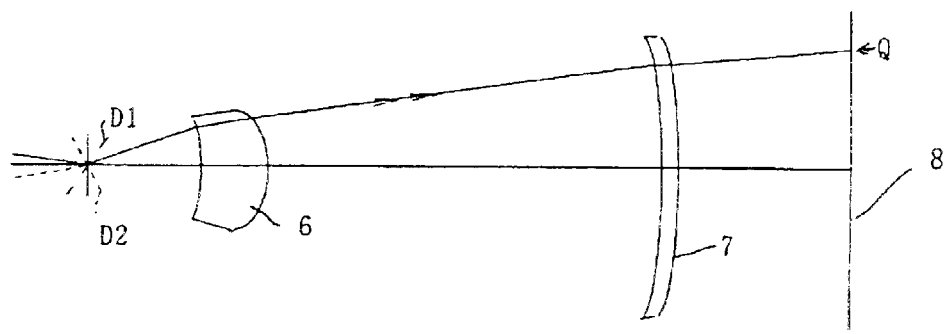

In FIG. 9C, reference sign $D_1$ denotes the position of the deflection reflecting surface of the polygon mirror 5, when the optical beam emitted from the semiconductor laser 1A reaches a "certain image height Q" on the surface 8 to be scanned, and reference sign $D_2$ denotes the position of the deflection reflecting surface of the polygon mirror 5, when the optical beam emitted from the semiconductor laser 1B reaches the image height Q on the surface 407 to be scanned.

The two optical beams are separated from each other by a certain angle $\Delta\alpha$, at the time of entering into the deflection reflecting surface of the polygon mirror. Therefore, the deflection reflecting surface rotates by the angle difference $\Delta\alpha$ in order that the two optical beams reach the image height Q.

As shown in FIG. 9C, when the two optical beams emitted from the semiconductor lasers 1A and 1B are made to "cross each other in the horizontal scanning direction" in the vicinity of the deflection reflecting surface of the polygon mirror, the respective optical beams transmit through the scanning lenses 6 and 7, "substantially at the same position in the horizontal scanning direction, when these optical beams reach the same image height Q in the horizontal scanning direction on the surface 8 to be scanned. As a result, the optical action of the scanning lenses 6 and 7 acts on the two optical beams in the same manner, and hence the influence of a deviation in the optical characteristic with respect to the optical beams can be effectively avoided.

The "change in the write position in the horizontal scanning direction between the optical beams due to a difference between parts" on the image surface side than the polygon mirror becomes substantially the same for the whole optical beams, and hence write misregistration in the horizontal scanning direction between the optical beams can be suppressed. Further, the imaging position in the horizontal scanning direction of the optical beams can be made to agree with each other with high accuracy, and even if a delay time is set common to the whole optical beams after detection of synchronization, a misregistration in the horizontal scanning direction at an image height at the initial stage of write can be suppressed.

The radius of inscribed circle of the polygon mirror 403 can be made the smallest, by having the configuration shown in FIG. 9C.

On the other hand, as shown in FIG. 9B, when the two optical beams do not cross each other in the horizontal scanning direction at the position of the deflection reflecting surface, the two optical beams pass through an optical path considerably different from each other in order to reach the same image height Q. Therefore, the two optical beams are subjected to "different optical actions" by the scanning lenses 6 and 7, and hence the influence of aberration with respect to the two optical beams reaching the same image height Q on the surface 8 to be scanned becomes different. As a result, there is a large influence of the scan line pitch with respect to a change in image height.

An example of the multi-beam scanning method has been explained with reference to FIG. 9A, but the similar effect can be obtained when optical beams going towards different surfaces to be scanned are deflected by the same deflection reflecting surface of the polygon mirror, if there is a plurality of surfaces to be scanned, by making the optical beams cross each other in the horizontal scanning direction in the vicinity of the deflection reflecting surface of the polygon mirror.

It is desired that a deviation in the crossing position in the horizontal scanning direction of the respective optical beams be within 0.5 millimeter on the deflection reflecting surface of the polygon mirror.

The optical scanner having the optical arrangement as shown in FIG. 1 can be also used as an optical system with respect to a tandem-type image forming apparatus.

For example, in FIG. 1, the optical path from the semiconductor laser 1 to the polygon mirror via the cylindrical lens 4 is superposed in four stages in a direction orthogonal to the page in FIG. 1, and these respective four optical paths can be used as the optical path relating to the optical beams for writing a four-color image of yellow (Y), magenta (M), cyan (C), and black (K). In this case, the polygon mirror 5 is shared by the four optical beams.

Figure 10A:
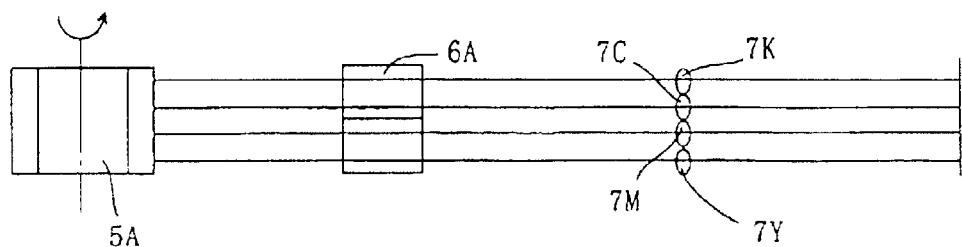
FIGS. 10A and 10B illustrate an optical scanner according to another embodiment of the present invention.
Figure 10B:
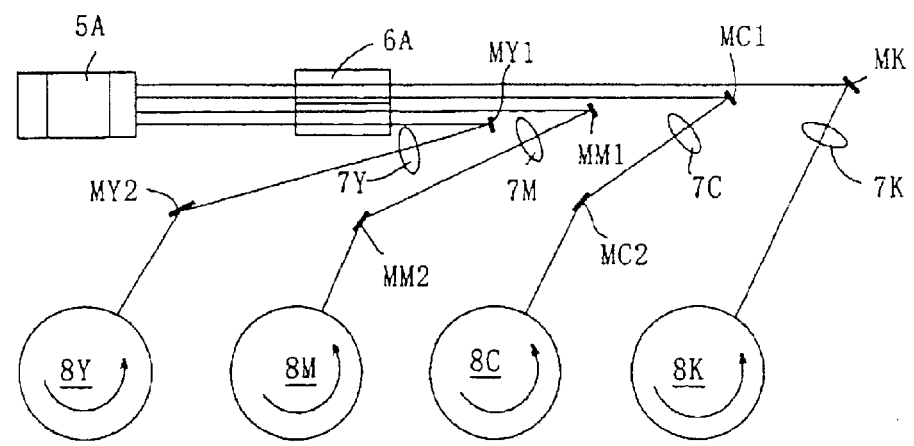

FIGS. 10A and 10B illustrate an optical scanner according to another embodiment of the present invention. In this optical scanner, a polygon mirror is commonly used by four optical beams. FIG. 10A illustrates the state in which the optical path from the common polygon mirror 5A to the surface to be scanned is linearly developed.

The polygon mirror 5A allows the four optical beams to be deflected at the same time. The deflected four optical beams transmit through the scanning lens 6A. That is, the scanning lens 6A is shared by the four optical beams. The respective optical beams having transmitted through the scanning lens 6A then transmit through the scanning lens 7Y, 7M, 7C, or 7K, respectively, and are guided to the corresponding surfaces 8Y to 8K to be scanned, and gathered on the respective surfaces to be scanned as a light spot, to thereby perform optical scanning.

The scanning lens 6 can have the configuration as shown in Examples 1 and 2. The scanning lens shown in Examples 1 and 2 does not have a refracting power in the vertical scanning direction, and the lens surface has no curvature in the vertical scanning direction. Therefore, as shown in FIG. 10, by increasing the lens width in the vertical scanning direction, it can be shared by the four optical beams.

The scanning lenses 7Y to 7K have the same configuration, and the scanning lens 7 in Examples 1 and 2 can be used therefor. In the and, by the scanning lens 6A and the scanning lenses 7Y to 7K, four sets of "scanning imaging lenses" are formed, and the respective scanning imaging lenses are formed of two scanning lenses.

FIG. 10B illustrates the state in which the four optical beams deflected by the polygon mirror 5A at the same time are guided to the photosensitive drums 8Y to 8K, constituting the corresponding surface to be scanned, respectively. The optical beam optically scanning the photosensitive drum 8Y transmits through the scanning lens 6A, is reflected by a mirror MY1, and gathered on the photosensitive drum 8Y via the scanning lens 7Y and a mirror MY2.

The optical beam optically scanning the photosensitive drum 8M transmits through the scanning lens 6A, is reflected by a mirror MM1, and gathered on the photosensitive drum 8M via the scanning lens 7M and a mirror MM2. The optical beam optically scanning the photosensitive drum 8C transmits through the scanning lens 6A, is reflected by a mirror MC1, and gathered on the photosensitive drum 8C via the scanning lens 7C and a mirror MC2. The optical beam optically scanning the photosensitive drum 8K transmits through the scanning lens 6A, is reflected by a mirror MK, and gathered on the photosensitive drum 8K via the scanning lens 7K.

On the side from the light source to the polygon mirror, the optical paths in the four layers are arranged parallel with each other in the vertical scanning direction, but in view of the layout of the optical scanner, the optical path may be folded back by a folding mirror or the like, so that a plurality of light sources has a distance in the horizontal scanning direction.

The scanning lens 6A closest to the deflection unit has a strong positive refracting power in the horizontal scanning direction, to correct the constant velocity characteristic. Therefore, by making this lens have a "configuration such that a plurality of optical beams going toward different surfaces 8Y to 8K to be scanned pass therethrough", a machining difference of the scanning lens 6A and a spot misregistration in the horizontal scanning direction due to a change in the optical characteristics due to a temperature change becomes the same between the different surfaces to be scanned. As a result, a "spot misregistration" in the horizontal scanning direction between different surfaces to be scanned, that is, between respective colors can be reduced, thereby enabling suppression of image deterioration due to out-of-color registration and a hue change.

Figure 11:
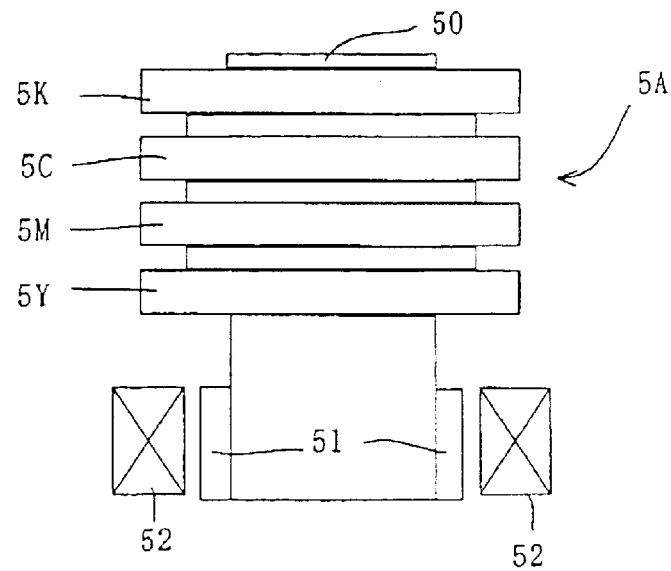
FIG. 11 illustrates a polygon mirror in the embodiment shown in FIG. 10.

The polygon mirror 5A shown in FIGS. 10A and 10B is shared by the four optical beams that optically scan the four surfaces 8Y to 8K to be scanned. The embodiment of the polygon mirror 5A will be explained with reference to FIG. 11.

The polygon mirror 5A has a configuration such that regular hexahedral pillars 5Y, 5M, 5C, and 5K forming the polygon mirror section and away from each other in the axial direction of the polygon mirror 5A are made of aluminum having a purity of not lower than 99%, and each pillar surface is mirror-finished, and "fixed by shrinkage fit" to the bearing shaft 50 consisting of a martensite type stainless steel.

The martensite type stainless steel (for example, SUS 420J2) can be hardened so as to have a high surface hardness, and has an excellent wear resistance as a bearing shaft. A rotor magnet 51 is fixed below the polygon mirror, to constitute an "outer rotor type brushless motor" together with a stator core (wound coil) 52.

The regular hexahedral deflection reflecting surface has an axial length (thickness) sufficient for deflecting the optical beams, specifically, an axial length of from 1 millimeter to 3 millimeters. If the thickness of the regular hexahedral pillar becomes not larger than 1 millimeter, since the regular hexahedral pillar becomes a thin plate, the rigidity at the time of mirror finish is low, and hence the flatness of the mirror surface deteriorates. On the contrary, if the thickness thereof is not smaller than 3 millimeters, the moment of inertia of rotation increases, and the starting time becomes long.

The portion between two regular hexahedral pillars has a smaller diameter than that of the radius of the inscribed circle of the regular hexahedral pillar, so as to reduce windage loss resulting from high-speed rotation. Since the windage loss due to the interval portion is determined by the maximum diameter of the peripheral circle, the corner portion of the circumscribed circle has a large influence. Therefore, it is desired to round the corner portion. On the other hand, the windage loss can be also reduced by making the interval portion have a smaller diameter than the diameter of the inscribed circle, but since this portion is between polyhedral portions, the reduction effect is relatively small.

As the polygon mirror 5A, one having the four-layer configuration in which the deflection reflecting surface is axially separated for each optical beam has been explained, but the configuration thereof may be a two-layer configuration, or a configuration in which the respective deflection reflecting surfaces become one surface in the direction of rotation axis may be used.

Figure 12:
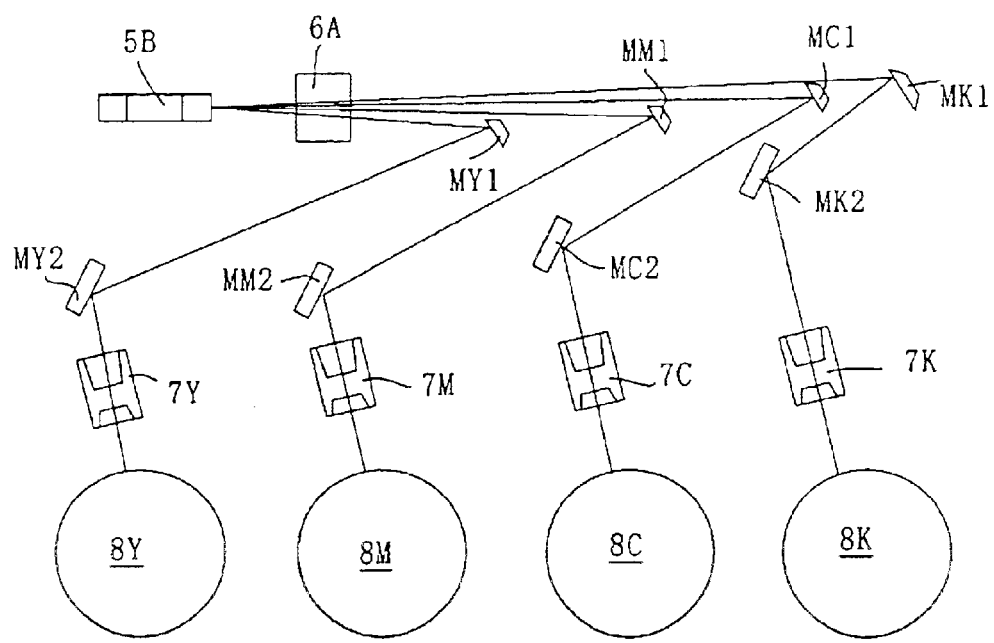
FIG. 12 illustrates a modification of the embodiment shown in FIG. 10.

An example, in which four optical beams from the light source side enter into the polygon mirror 5A shared by the four optical beams, so as to be parallel with each other in the vertical scanning direction, and orthogonal to the rotation axis of the polygon mirror 5A, has been explained with reference to FIG. 10. However, as shown in FIG. 12, the four optical beams may enter into the polygon mirror 5B, inclined with respect to each other. In this case, the polygon mirror 5B has a small axial height, a small windage loss resulting from the high-speed rotation, and a small moment of Inertia, and hence high-speed rotation becomes easy.

Figure 13:
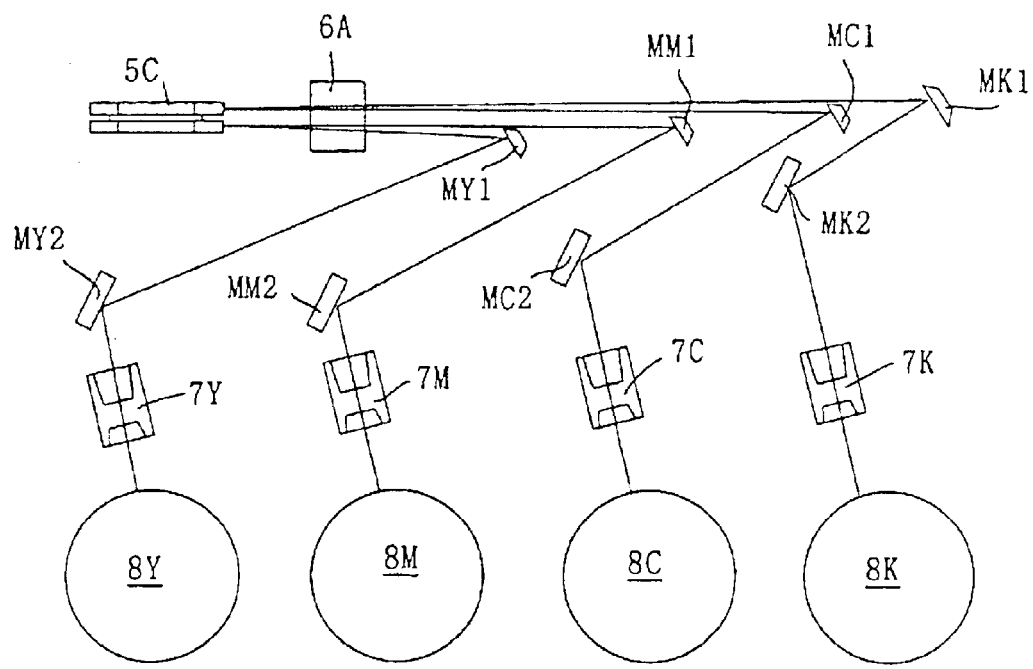
FIG. 13 illustrates another modification of the embodiment shown in FIG. 10.

Further, as shown in FIG. 13, a polygon mirror 5C obtained by superposing regular hexahedral pillars in two layers may be used, so that two optical beams are made to enter into the respective regular hexahedral pillars, inclined with respect to each other. Also in this case, since the axial height of the polygon mirror 5C is small, the windage loss resulting from high-speed rotation is small, and hence high-speed rotation becomes easy.

In FIGS. 12 and 13, reference signs MK1 and MK2 denote folding mirrors, which fold back the optical path of optical beams that optically scan the photosensitive drum 8K.

As in the example shown in FIGS. 12 and 13, the scanning lenses 7Y to 7K close to the scanned surface side may be provided on the photosensitive drum side than the mirrors MY2 to MK2.

In the optical arrangement in FIGS. 10A, 10B, 12, and 13, the scanning lens 5A is shared by the four optical beams. By sharing the scanning lens 5A by the four optical beams, the lens width in the vertical scanning direction of the scanning lens 5A increases, and as described above, when it is formed by resin molding, there is a problem in that it becomes difficult to cool the lens in the mold, and as a result, the molding time increases, and if the molding time is forcibly reduced, it will cause deterioration in the surface precision and cost increase.

Figure 14:
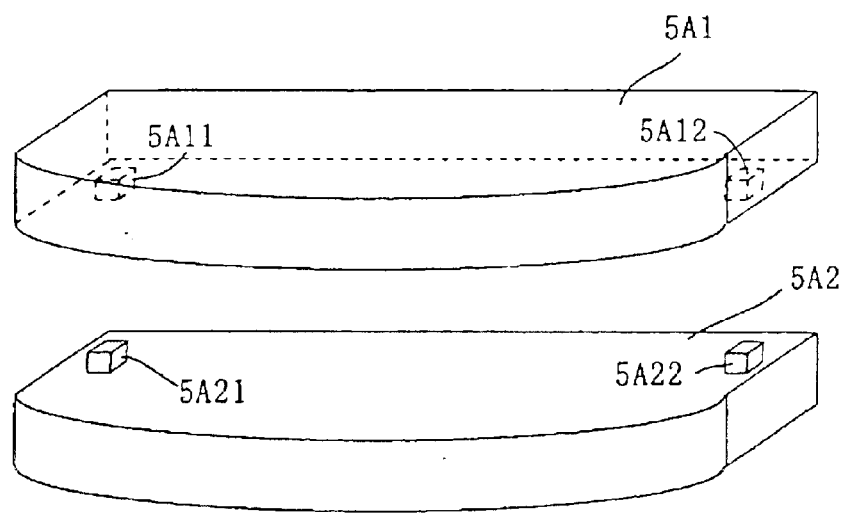
FIG. 14 illustrates a scanning lens obtained by superposing two lenses.

In order to avoid this problem, as shown in FIG. 14, the scanning lens 6A is formed from two lenses 5A1 and 5A2 having the same optical characteristics in the vertical scanning direction (in the thickness direction), and these may be superposed on each other and integrated. Integration may be performed by fitting positioning protrusions 5A21 and 5A22 in the lens 5A2 to positioning concave portions 5A11 and 5A12 in the lens 5A1. In the example shown in FIGS. 10A and 10B, the scanning lens 6A has a configuration of superposing these two lenses.

Figure 15:
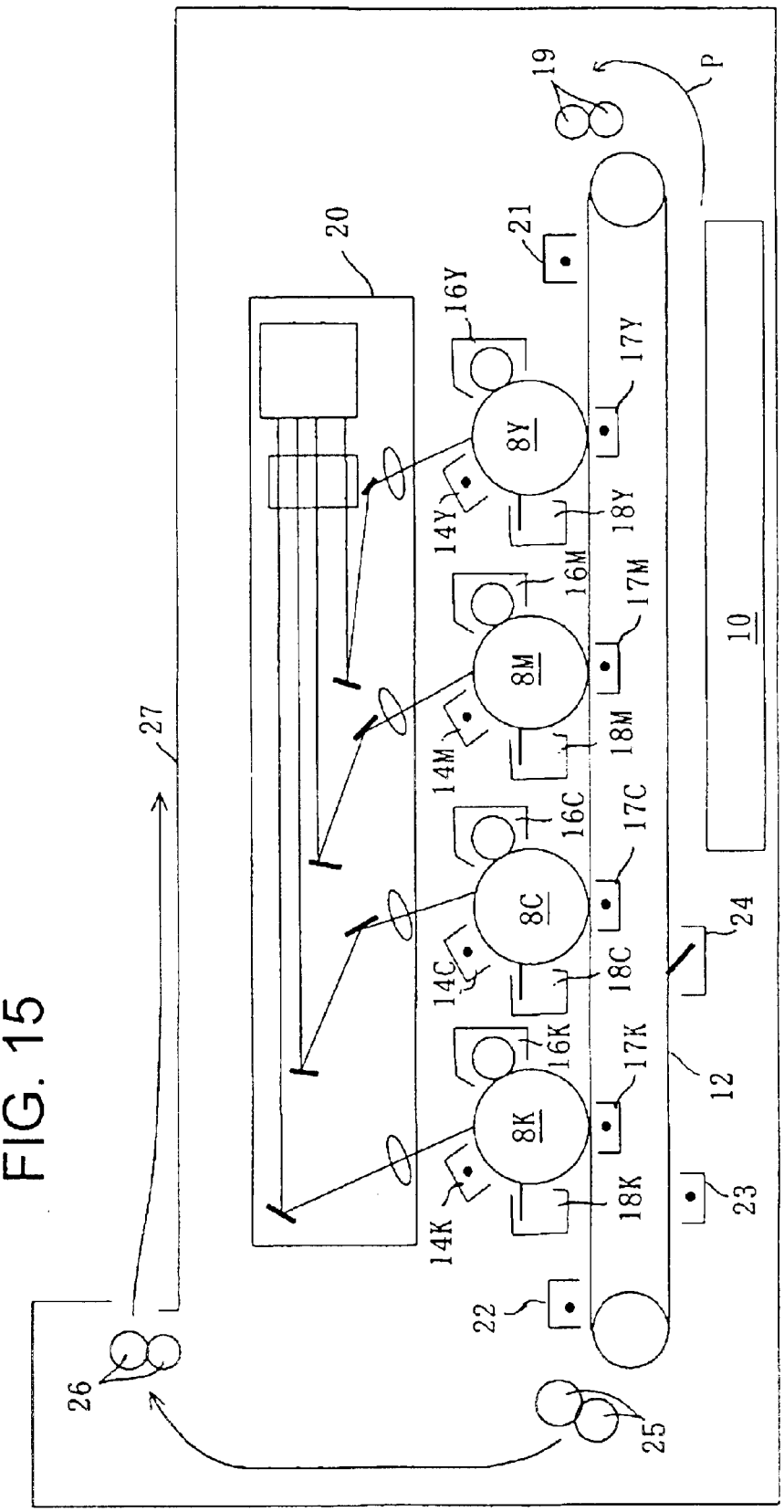
FIG. 15 illustrates an image forming apparatus according to another embodiment of the present invention.

Lastly, an embodiment of a tandem-type image forming apparatus corresponding to full colors, having the optical scanner mounted therein, will be explained with reference to FIG. 15.

A paper feed cassette 10 is arranged on the lower side of the apparatus, and a transfer belt 12 for transporting the transfer paper (sheet-form recording medium) P fed from the paper feed cassette 10 is provided above the paper feed cassette 10. On the transfer belt 12, photoconductive photosensitive drums 8Y, 8M, 8C, and 8K formed in a drum shape are arranged sequentially from the upstream side of transporting the transfer paper at equal intervals.

The photosensitive drums 8Y, 8M, 8C, and 8K have the same diameter, and process units that execute the electrophotographic process are respectively arranged around the respective photosensitive drums. Since the arrangement and the operation of the process units are the same with respect to the photosensitive drums Y to K, the photosensitive drum 8Y is explained as an example. A charging charger 14Y, development apparatus 16Y, a transfer charger 17Y, and a cleaning unit 18Y are arranged, so as to surround the photosensitive material BY clockwise in the above order. Other photosensitive materials 8M, 8C, and 8K are likewise.

An optical scanner 20 arranged above the arrangement of the photosensitive drums 8Y to 8K is the same type as explained in FIG. 10, and optically scans the photosensitive drums 8Y to 8K between the charging charger and the development apparatus.

On the periphery of the transfer belt 12, a resist roller pair 19 and a belt charging charger 21 are provided on the upstream side of the photosensitive material 8Y, a belt-separating charger 22 is provided on the downstream side of the photosensitive material 8K, and a discharging charger 23 and a cleaning unit 24 are provided on the lower face of the belt.

Fixing apparatus 25 is provided on the downstream side in the transport direction of the belt-separating charger 22, to form a feed path leading to a paper discharge tray 27 via a paper discharge roller pair 26.

In the full-color mode (plural color mode), the photosensitive drums 8Y, 8M, 8C, and 8K are uniformly charged by the charging charger, to form an electrostatic latent image with respect to the respective image components by optical scanning by the optical scanner 20, based on the image signal of yellow, magenta, cyan, and black image components.

These electrostatic latent images are developed by the development apparatus 16Y and the like, and visualized as the respective color toner images of yellow, magenta, cyan, and black.

The transfer paper P to carry the color image is fed from the paper feed cassette 10, and put on the transfer belt 12 at a good timing by the resist roller pair 19. At this time, the transfer belt 12 is charged by the belt-charging charger 21, and electrostatically attracts the transfer paper P. While the transfer paper P is transported on the transfer belt 12, the yellow toner image is transferred thereon from the photosensitive material 8Y by the transfer charger 17Y.

Subsequently, by transfer chargers 17M, 17C, and 17K, the magenta toner image, the cyan toner image, and the black toner image are sequentially transferred thereon from the photosensitive drums 8M, 8C, and 8K. The four color toner images are superposed on each other in this manner, to thereby form a color image on the transfer paper P. The respective photosensitive materials after the toner image transfer are cleaned by the cleaning unit 18Y and the like, thereby removing the residual toner and paper dust.

The transfer paper P carrying this color image thereon is separated from the transfer belt 12 by the belt-separating charger 22, and the color image is fixed while passing through the fixing apparatus 25, and the transfer paper P is discharged onto the paper discharge tray 27 by the paper discharge roller pair 26. The transfer belt 12 after the transfer paper P is separated therefrom is discharged by the discharging charger 23, and cleaned by the cleaning unit 24.

In the black mode (monochrome mode), the imaging process with respect to the photosensitive materials 8Y, 8M, and 8C is not executed, and the image formation process is executed with respect to only the photosensitive drum 8K.

As explained above, according to the present invention, the optical scanner and the image forming apparatus can be achieved. The optical scanner of the present invention can perform optical scanning by a light spot having a small spot diameter, since the requirement with respect to the linearity characteristic of the scanning imaging lens is slightly relaxed, thereby correcting other optical characteristics favorably. Further, a problem resulting form the linearity characteristic can be sufficiently corrected by changing the timing of the modulation signal of the light source, as in the optical scanner according to the second and the third aspects.

The image forming apparatus of the present invention can form an excellent image by using the optical scanner.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical scanner comprising:

a deflecting unit that deflects optical beams emitted from a light source at a constant angular velocity; and a scanning imaging lens that condenses the optical beams deflected on a surface to be scanned, the scanning imaging lens including at a first lens that is arranged closer to the deflection unit and a second lens that is arranged closer to the surface to be scanned, wherein the first lens is formed by resin molding, and has a positive refracting power in the horizontal scanning direction, with zero or close to zero refracting power in the vertical scanning direction, and has a function of correcting a constant velocity characteristic in the optical scanning, the second lens has a weak refracting power in the horizontal scanning direction and a strong positive refracting power in the vertical scanning direction, and when it is assumed that a deflection angle of optical beams deflected by the deflection unit is θ, an image height at the deflection angle θ of the light spot is H(θ), and an ideal image height at the deflection angle θ of the light spot is kθ, designating k as a constant, the linearity Lin of the scanning imaging lens defined by $$Lin=[\{(dH(\theta)/d\theta)/k\}-1]\times100(\%)$$

satisfies a condition $$2.0<Lin<10.0(\%).$$

2. The optical scanner according to claim 1, further comprising a modulation-variable mechanism that corrects the linearity Lin by changing the timing of a modulation signal of the light source.

3. The optical scanner according to claim 2, wherein the modulation-variable mechanism performs phase shift of a pixel clock based on a high-frequency clock higher than the pixel clock.

4. The optical scanner according to claim 1, wherein the light source emits a plurality of optical beams, and the deflection unit deflects the optical beams in such a manner that all the optical beams deflected from the same deflection reflecting surface of the deflection unit cross each other in the horizontal scanning direction in the vicinity of the deflection surface.

5. The optical scanner according to claim 1, wherein a lens thickness $X_1$ in the direction of optical axis on the optical axis, a thickness $X_{1e}$ of the thinnest portion, a lens height $T_1$ of only an optical surface in the vertical scanning direction, and a lens length $L_1$ of only the optical surface in the horizontal scanning direction of the first lens satisfy the following conditions, together with the effective write width $W_0$ on the surface to be scanned $$0.2<|X_{1e}/X_1|<0.4$$

$$0.4<|T_1/X_1|<0.65$$

$$0.3<|L_1/W_0|<0.5.$$

6. The optical scanner according to claim 1, wherein a lens thickness $X_1$ in the direction of optical axis on the optical axis, a thickness $X_{1e}$ of the thinnest portion, a lens height $T_1$ of only an optical surface in the vertical scanning direction, and a lens length $L_1$ of only the optical surface in the horizontal scanning direction of the second lens satisfy following conditions, together with the effective write width $W_0$ on the surface to be scanned $$0.5<|X_{2e}/X_2|<0.8$$

$$0.2<|X_2/T_2|<0.5$$

$$0.8<|L_2/W_0|<0.95.$$

7. The optical scanner according to claim 1, wherein a lateral magnification $\beta_0$ in the vertical scanning direction on the optical axis between the deflection reflecting surface and the surface to be scanned, and a lateral magnification $\beta_h$ in the vertical scanning direction at an optional image height h satisfy a condition $$0.9<|\beta_h/\beta_0|<1.1.$$

8. The optical scanner according to claim 1, wherein the lateral magnification $\beta_0$ in the vertical scanning direction on the optical axis between the deflection reflecting surface and the surface to be scanned satisfies a condition $$0.2<|/\beta_0|<0.6.$$

9. An image forming apparatus comprising an optical scanner that optically scans a photosensitive medium, the optical scanner including a deflecting unit that deflects optical beams emitted from a light source at a constant angular velocity; and a scanning imaging lens that condenses the optical beams deflected on a surface to be scanned, the scanning imaging lens including at a first lens that is arranged closer to the deflection unit and a second lens that is arranged closer to the surface to be scanned, wherein the first lens is formed by resin molding, and has a positive refracting power in the horizontal scanning direction, with zero or close to zero refracting power in the vertical scanning direction, and has a function of correcting a constant velocity characteristic in the optical scanning, the second lens has a weak refracting power in the horizontal scanning direction and a strong positive refracting power in the vertical scanning direction, and when it is assumed that a deflection angle of optical beams deflected by the deflection unit is θ, an image height at the deflection angle θ of the light spot is H(θ), and an ideal image height at the deflection angle θ of the light spot is kθ, designating k as a constant, the linearity Lin of the scanning imaging lens defined by $$Lin=[\{(dH(\theta)/d\theta)/k\}-1]\times100(\%)$$

satisfies a condition $$2.0<Lin<10.0(\%).$$

10. The image forming apparatus according to claim 9, wherein the photosensitive medium is made of a photoconductive photosensitive material and provided in plurality along a feed path of a toner image transfer medium.

* * * * *